United States Patent [19]
Shindo et al.

[11] Patent Number: 5,291,234
[45] Date of Patent: Mar. 1, 1994

[54] AUTO OPTICAL FOCUS DETECTING DEVICE AND EYE DIRECTION DETECTING OPTICAL SYSTEM

[75] Inventors: Osamu Shindo; Shigeo Toji, both of Tokyo, Japan

[73] Assignee: Asahi Kogaku Kogyo Kabushiki Kaisha, Tokyo, Japan

[21] Appl. No.: 926,367

[22] Filed: Aug. 7, 1992

Related U.S. Application Data

[60] Continuation of Ser. No. 575,636, Aug. 31, 1990, abandoned, which is a division of Ser. No. 520,970, May 9, 1990, abandoned, which is a continuation of Ser. No. 374,564, Jul. 5, 1989, abandoned, which is a continuation of Ser. No. 152,359, Feb. 4, 1988, abandoned.

[30] Foreign Application Priority Data

| Feb. 4, 1987 | [JP] | Japan | 62-22561 |
| Jun. 11, 1987 | [JP] | Japan | 62-146067 |
| Nov. 20, 1987 | [JP] | Japan | 62-293751 |
| Dec. 3, 1987 | [JP] | Japan | 62-306746 |
| Dec. 17, 1987 | [JP] | Japan | 62-319337 |

[51] Int. Cl.$^5$ ............................................. G03B 13/36
[52] U.S. Cl. .................................. 354/402; 354/404
[58] Field of Search ............... 354/400, 402, 403, 406, 354/407, 408, 404

[56] References Cited

U.S. PATENT DOCUMENTS

| Re. 31,370 | 9/1983 | Mashimo et al. | |
| 2,922,351 | 1/1960 | Hering | 354/404 |
| 3,691,922 | 9/1972 | Konig et al. | 354/404 |
| 4,047,187 | 11/1988 | Mashimo et al. | |
| 4,183,642 | 1/1980 | Fukuoka | |
| 4,333,716 | 6/1982 | Sakano et al. | 354/404 |
| 4,574,314 | 3/1986 | Weinblatt | |
| 4,768,052 | 8/1988 | Hamada et al. | 354/402 |
| 4,786,934 | 9/1977 | Kunze et al. | |
| 4,843,415 | 6/1989 | Matsui et al. | 354/403 |

FOREIGN PATENT DOCUMENTS 0055338 7/1982 European Pat. Off. .
(List continued on next page.)

OTHER PUBLICATIONS

English Language translation of German Office Action of Feb. 17, 1993.
L. R. Young and D. Sheena, "Survey of Eye Movement Recording Methods", *Behavior Research Methods and* (List continued on next page.)

*Primary Examiner*—Russell E. Adams
*Attorney, Agent, or Firm*—Sandler, Greenblum and Bernstein

[57] ABSTRACT

An auto optical focus detecting device of a camera comprises a center zone being located in a center of a view finder of a camera body; at least two peripheral zones being located in the view finder, one of the two peripheral zones center zone and the other being located in the left-hand side; the camera body containing a center auto focus optical system and at least two peripheral auto focus optical systems; the center auto focus optical system having a zone corresponding to the center zone, the zone being substantially conjugate with the center zone; the peripheral auto focus optical systems, respectively, having a substantially conjugate zone corresponding to the peripheral zone, each zone being substantially conjugate with the peripheral zone; a photographic lens being attached to the camera body, an exit pupil of the photographic lens being looked through the center zone of the center auto focus optical system, at least two aperture zones being defined on the exit pupil by the at least two peripheral auto focus optical systems, each of the aperture zones being looked through the peripheral zone, at least one of the two aperture zones being located at an upper side away from a central portion of the exit pupil and the other being located at a lower side away from the central portion; the center auto focus optical system and the two peripheral auto focus optical systems, respectively, having at least one photoelectronic device for producing an output signal; and the output signal produced by the photoelectronic device being adapted to move the photographic lens automatically, thereby to bring the camera to be in focus.

64 Claims, 21 Drawing Sheets

FOREIGN PATENT DOCUMENTS

| | | |
|---|---|---|
| 1211815 | 3/1966 | Fed. Rep. of Germany . |
| 1930007 | 9/1970 | Fed. Rep. of Germany . |
| 3329603 | 3/1984 | Fed. Rep. of Germany . |
| 3505864 | 8/1985 | Fed. Rep. of Germany . |
| 2382056 | 9/1978 | France . |
| 60-32012 | 2/1985 | Japan . |
| 60-41013 | 3/1985 | Japan . |
| 62-47612 | 3/1987 | Japan . |
| 62-189415 | 8/1987 | Japan . |
| 8701571 | 3/1987 | World Int. Prop. O. . |

OTHER PUBLICATIONS

*Instrumentation*, vol. 7 (5), 1975, pp. 400–405 and 417–418.

G. Schroder, "Techische Optik Kurz und bundig", Vogel-Verlag 1974, p. 41, and English translation.

"Psychological Physic of Vision", by Mitsuo Ikeda, 1975.

"Fixation Point Measurement by the Oculometer Technique", Optical Engineering, Jul./Aug. 1974, pp. 339–342.

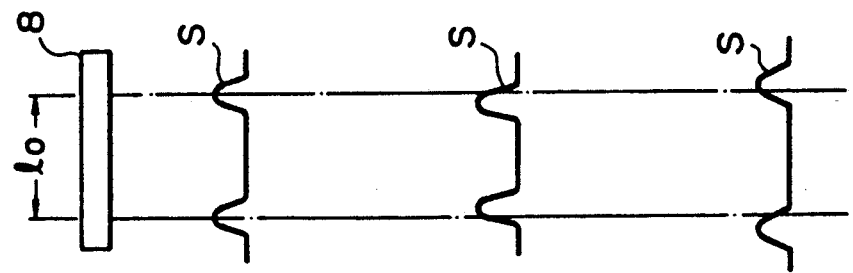
F I G. 4
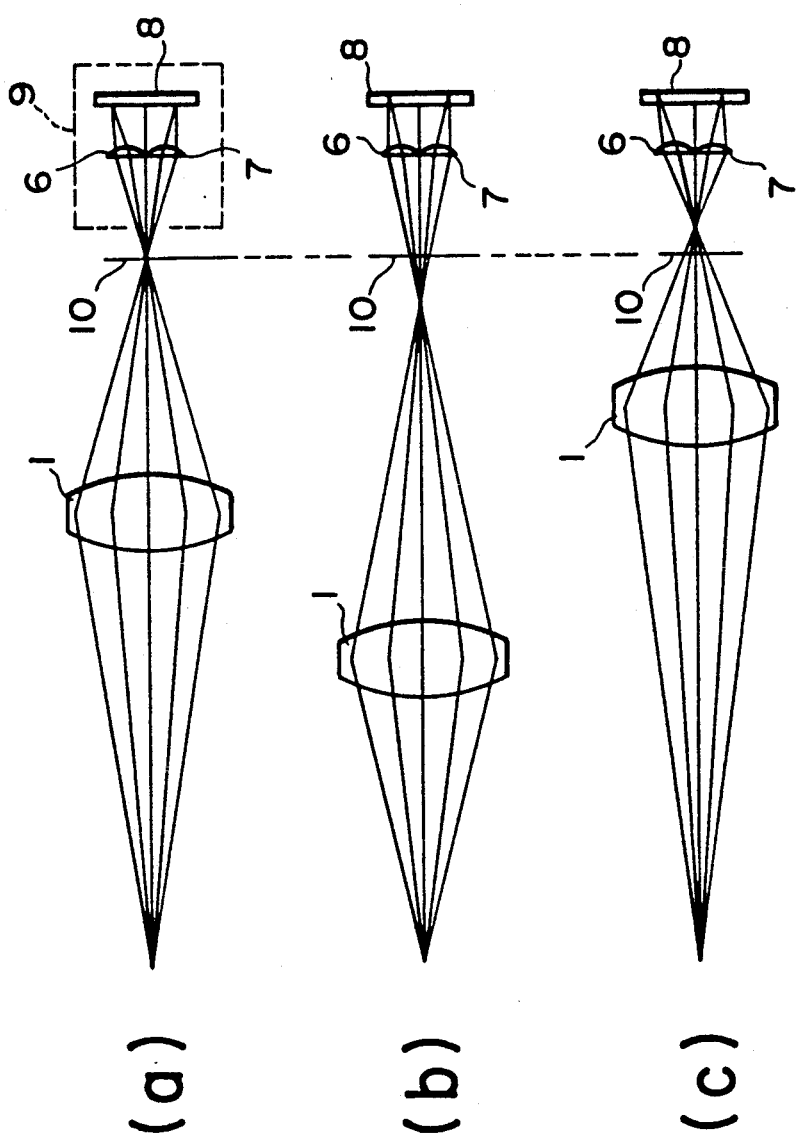
F I G. 3

F I G. 30
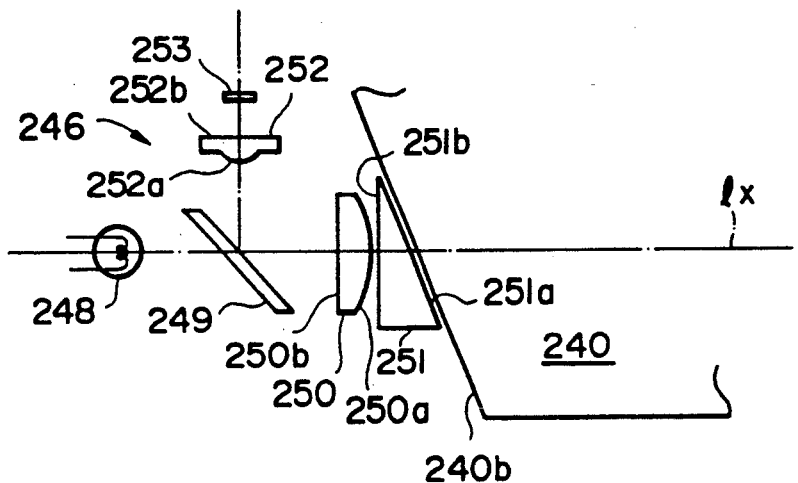
F I G. 31
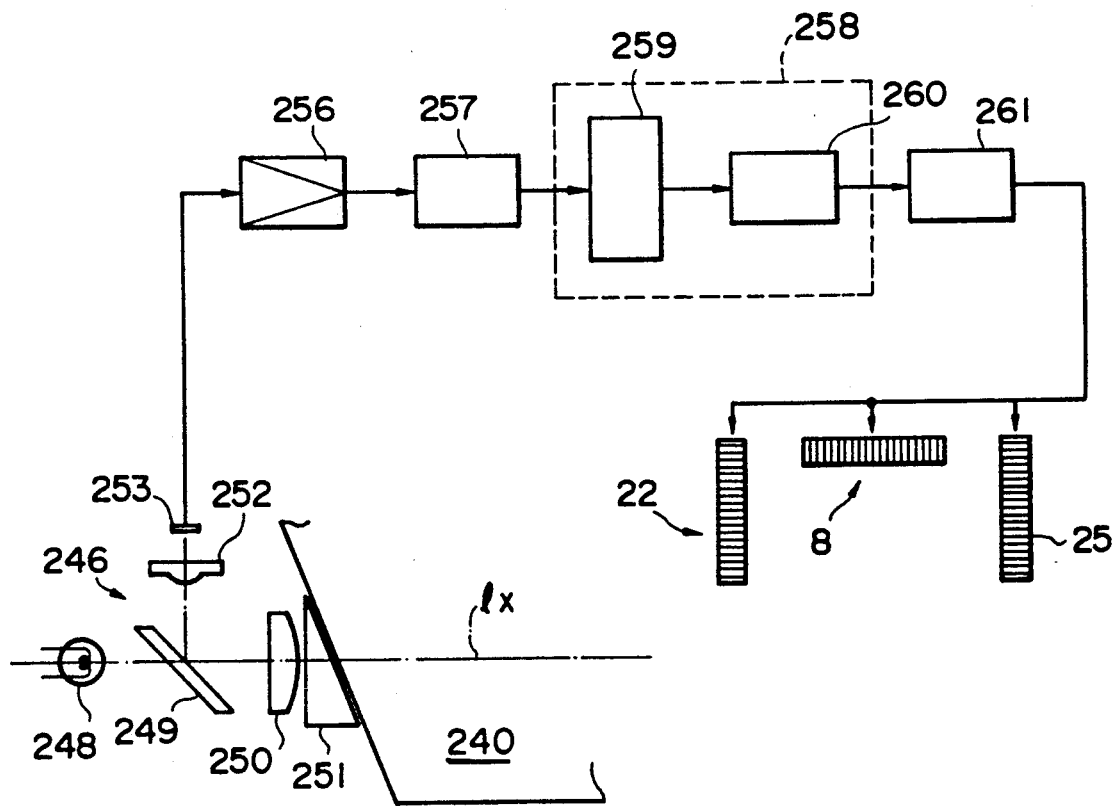

AUTO OPTICAL FOCUS DETECTING DEVICE AND EYE DIRECTION DETECTING OPTICAL SYSTEM

This application is a continuation of application Ser. No. 07/575,636, filed Aug. 31, 1990, now abandoned, which is a divisional of application Ser. No. 07/520,970, filed May 9, 1990, now abandoned,; which is a continuation of application Ser. No. 07/374,564, filed Jul. 5, 1989, now abandoned; which is a continuation of application Ser. No. 07/152,359, filed Feb. 4, 1988, now abandoned.

TECHNICAL FIELD

This invention relates to an improvement on an auto optical focus detecting device of a camera such as, for example, a single-lens reflex camera, having an auto focus optical system.

BACKGROUND OF THE INVENTION

There has been known an auto optical focus detecting device of a camera having an auto focus optical system. FIG. 1 is a schematic view showing an optical system of an auto optical focus detecting device of, for example, a single-lens reflex camera which has the auto focus optical system. In the figure, 1 denotes a photographic lens, 2 a subject to be photographed, 3 a view field mask, 4 a condenser lens, 5 a diaphragm mask, 6 and 7 a separator lens as an image splitting optical element, and 8 a CCD as a image receiving element. The view field mask 3, the condenser lens 4, the diaphragm mask 5, the separator lenses 6 and 7, and the CCD 8 are integrally modulated as one unit and constitute an auto focus optical system 9.

In this auto focus optical system 9, the view field mask 3 is disposed in the vicinity of a film equivalent plane 10. The film equivalent plane 10 is in a position optically conjugate with the subject 2 to be photographed through the photographic lens 1. A well focussed image 11 of the subject 2 is formed on the film equivalent plane 10 when the photographic lens 1 is in focus. The condenser lens 4 and the diaphragm mask 5 have the function of splitting the photographic light passing on both right and left sides of the photographic lens 1. The separator lenses 6 and 7 are in a position optically conjugate with the photographic lens 1 through a condenser lens 4.

The separator lenses 6 and 7, as shown in FIG. 2, are disposed in the horizontal direction. Further, the separator lenses 6 and 7 face imaginary opening areas 14 and 15 of an exit pupil 13 of the photographic lens 1 through a zone 12 located in a position optically conjugate with a center zone of a finder as will be described. The separator lenses 6 and 7 intake a bundle of rays passed through the opening areas 14 and 15. The image 11 formed on the film equivalent plane 10 is reimaged as images 11′ in two areas on the CCD 8.

A distance between the images 11′ well focussed (see FIG. 3($a$)) is represented by $l_o$ as shown in FIG. 4. When the photographic lens 1 is focussed in a position in front of shown in FIG. 3($b$), the distance between the images 11′ becomes less and, as a result, the distance between signals S corresponding thereto becomes less than the distance $l_o$. On the contrary, when the photographic lens 1 is focussed in a position behind, the focal point of the afore-mentioned well focussed image as shown in FIG. 3($c$), the distance between the images 11′ becomes greater and, as a result, a distance between signals S corresponding thereto becomes greater than the distance $l_o$. Since the distance between the images 11′ is changed in proportion to a defocussing amount of the photographic lens 1, in the conventional auto optical focus detecting device of a single-lens reflex camera, a distance between images of the CCD 8 is detected and the signals are arithmetically processed, and the photographic lens 1 is moved to the focal position with reference to the focussing direction and defocussing amount of the photographic lens 1. And, as shown for example in FIG. 5, if the optical focus is found by framing as such that a desired subject 2 to be photographed is located in the center zone 17 arranged at the center of the finder 16, the photographic lens 1 is automatically brought to a focussing state. If a photograph is taken in the foregoing state, a well focussed photograph can be obtained.

In this conventional auto optical focus detecting device of a single-lens reflex camera, since the zone is located in the center of the finder 16, a desired subject 2 will be positioned in the center of an obtained photograph unless an adequate arrangement is made. However, there are some instances where a desired subject 2 is preferably positioned in the peripheral area of a photograph instead of the center thereof. To this end, thereofore, in the conventional single-lens reflex camera, a focus lock mechanism is provided. That is, the subject 2 to be photographed is positioned in the center of the finder 16 to automatically find the distance to the subject 2. In that state, the focus is locked. If a photograph is taken in the framing as shown in FIG. 6, a photograph can be obtained in which a desired subject 2 is positioned in the peripheral area.

However, in this conventional auto optical focus detecting device of a single-lens reflex camera, the subject 2 must first be positioned in the center of the finder 16. Then, the photographic lens 1 must be moved to a focussing state. In that state, the focus must be locked to fix the photographic lens 1. Then, the framing must be performed once again. Only thereafter, a photograph can be taken. Therefore, much time and labor are required before the camera is ready to take a photograph.

SUMMARY OF THE INVENTION

It is therefore a first object of the present invention to provide an auto optical focus detecting device for a single-lens reflex camera, in which a photographic operation for obtaining a photograph with a desired subject positioned in a peripheral area can be easily and rapidly performed.

In order to achieve the first object, an auto optical focus detecting device of a camera according to the present invention comprises a center zone being located in a center of a view finder of a camera body; at least two peripheral zones being located in the view finder, one of the two peripheral zones being located in the right-hand side with respect to the center zone and the other being located in the left-hand side; the camera body containing a center auto focus optical system and at least two peripheral auto focus optical systems; the center auto focus optical system having a zone corresponding to the center zone, the zone being substantially conjugate with the center zone; the peripheral auto focus optical systems, respectively, having a substantially conjugate zone corresponding to the peripheral zone, each zone being substantially conjugate with the peripheral zone; a photographic lens being attached to the camera body, an exit pupil of the photographic lens being optically aligned to project light rays through the center zone of the center auto focus optical system, at least two aperture zones being defined on the exit pupil by the at least two peripheral auto focus optical systems, each of the aperture zones being optically aligned to project light rays through the peripheral zone, at least one of the two aperture zones being located at an upper side away from a central portion of the exit pupil and the other being located at a lower side away from the central portion; the center auto focus optical system and the two peripheral auto focus optical systems, respectively, having at least one photoelectronic device for producing an output signal; and the output signal produced by the photoelectronic device being adapted to move the photographic lens automatically, thereby to bring the camera to be in focus.

According to this auto optical focus detecting device, when a photograph with a subject to be photographed positioned in a peripheral area is required, a distance to the subject can be automatically found by using a peripheral auto focus optical system adapted to find the distance to the peripheral area without the afore-mentioned troublesome photographic procedure. Therefore, a photograph can be taken rapidly.

In the invention having the above-mentioned embodiment for achieving the first object, if the separator lens of the peripheral auto focus optical system is not optically aligned with the exit pupil at predetermined angles the image detecting accuracy of the auto focus optical system becomes poor due to vignetting. Therefore, the angle of the separator lens with respect to the exit pupil of the photographic lens of the peripheral auto focus optical system must be adjusted each time according to the lens characteristic (for example, whether the lens has a short focal point or a long focal point) of a photographic lens mounted on a lens mount which is to be attached to and detached from the camera body.

The fact that the adjustment and/or establishment of the angles for the separator lens of the peripheral auto focus optical system with respect to the exit pupil of the photographic lens depending on whether the photographic lens mounted on the lens mount has a short focal point or a long focal point must be carried out manually, causes much inconvenience for standardizing a camera body since various kinds of lens groups are prepared as interchangable lens mounts which are to be attached to or detached from the camera body.

It is therefore a second object of the present invention to provide an auto optical focus detecting device of a camera, in which the adjustment and/or establishment of angles can be automatically performed as such that a direction of a bundle of rays taken into the peripheral auto focus optical system is directed toward the exit pupil of the photographic lens according to the attachment of a lens mount to a camera body.

In order to achieve the second object, an auto optical focus detecting device of a single-lens reflex camera according to the present invention comprises a center zone being located in a center of a view finder of a camera body; at least two peripheral zones being located in the view finder, one of the two peripheral zones being located in the right-hand side with respect to the center zone and the other being located in the left-hand side; the camera body containing a center auto focus optical system and at least two peripheral auto focus optical systems; the center auto focus optical system having a zone corresponding to the center zone, the zone being substantially conjugate with the center zone; the peripheral auto focus optical systems, respectively, having a substantially conjugate zone corresponding to the peripheral zone, each zone being substantially conjugate with the peripheral zone; a photographic lens being attached to the camera body, an exit pupil of the photographic lens being optically aligned to project light rays through the center zone of the center auto focus optical system, at least two aperture zones being defined on the exit pupil by the at least two peripheral auto focus optical systems, each of the aperture zones being optically aligned to project light rays through the peripheral zone, at least one of the two aperture zones being located at an upper side away from a central portion of the exit pupil and the other being located at a lower side away from the central portion; the center auto focus optical system and the two peripheral auto focus optical systems, respectively, having at least one photoelectronic device for producing an output signal; and the output signal produced by the photoelectronic device being adapted to move the photographic lens automatically, thereby to bring the camera to be in focus, each of the peripheral auto focus optical systems comprising a focus unit, the camera body having at least one optical member which is located in front of the focus unit, and the optical member changing a direction of a bundle of rays coming through the aperture zone, thus the bundle of rays coming through the aperture zone being automatically made incident to the zone of each peripheral auto focus optical system according to the photographic lens characteristic.

As another embodiment for achieving the second object, an auto optical focus detecting device of a single-lens reflex camera according to the present invention comprises a center zone being located in a center of a view finder of a camera body; at least two peripheral zones being located in the view finder, one of the two peripheral zones being located in the right-hand side with respect to the center zone and the other being located in the left-hand side; the camera body containing a center auto focus optical system and at least two peripheral auto focus optical systems; the center auto focus optical system having a zone corresponding to the center zone, the zone being substantially conjugate with the center zone; the peripheral auto focus optical systems, respectively, having a substantially conjugate zone corresponding to the peripheral zone, each zone being substantially conjugate with the peripheral zone; a photographic lens being attached to the camera body, an exit pupil of the photographic lens being optically aligned to project light rays through the center zone of the center auto focus optical system, at least two aperture zones being defined on the exit pupil by the at least two peripheral auto focus optical systems, each of the aperture zones being optically aligned to project light rays through the peripheral zone, at least one of the two aperture zones being located at an upper side away from a central portion of the exit pupil and the other being located at a lower side away from the central portion; the center auto focus optical system and the two peripheral auto focus optical systems, respectively, having at least one photoelectronic device for producing an output signal; the output signal produced by the photoelectronic device being adapted to move the photographic lens automatically, thereby to bring the camera to be in focus; the each peripheral auto focus optical system comprising a rotatable focus unit containing the camera body, and when a lens mount for the photographic lens being attached to the camera body, the rotatable focus unit being rotated mechanically, thus a bundle of rays coming through the aperture zone being automatically made incident to the zone of each peripheral auto focus optical system according to the photographic lens characteristic.

According to the above-mentioned further embodiment for achieving the second object, even if the photographic lens is replaced with other lens having a different focal distance, the optical axis of the peripheral auto focus optical system can be mechanically and automatically brought to be faced with the center of the exit pupil of the photographic lens by mounting action of the photographic lens to the camera body so as to avoid the problem of vignetting.

A third object of the present invention is to provide an auto optical focus detecting device of a single-lens reflex camera, in which a zone intended by a user is automatically detected out of a plurality of zones provided within a view field of the finder and automatically find a distance to a subject to be photographed which is seen in an overlapped state with the zone intended by the user.

In order to achieve the third object, an auto optical focus detecting device of a single-lens reflex camera according to the present invention comprises:
- a center zone being located in a center of a view finder of a camera body;
- at least two peripheral zones being located in the view finder, one of the two peripheral zones being located in the right-hand side with respect to the center zone and the other being located in the left-hand side;
- the camera body containing a center auto focus optical system and at least two peripheral auto focus optical systems;
- the center auto focus optical system having a zone corresponding to the center zone, the zone being substantially conjugate with the center zone;
- the peripheral auto focus optical systems, respectively, having a substantially conjugate zone corresponding to the peripheral zone, each zone being substantially conjugate with the peripheral zone;
- a photographic lens being attached to the camera body, an exit pupil of the photographic lens being optically aligned to project light rays through the center zone of the center auto focus optical system, at least two aperture zones being defined on the exit pupil by the at least two peripheral auto focus optical systems, each of the aperture zones being optically aligned to project light rays through the peripheral zone, at least one of the two aperture zones being located at an upper side away from a central portion of the exit pupil and the other being located at a lower side away from the central portion;
- the center auto focus optical system and the two peripheral auto focus optical systems, respectively, having at least one photoelectronic device for producing an output signal;
- the output signal produced by the photoelectronic device being adapted to move the photographic lens automatically, thereby to bring the camera to be in focus; the camera body having a detecting optical system for detecting a direction of user's eye who looks into the finder to know that one of the zones of the view finder has been automatically selected.

A fourth object of the present invention is to provide an eye direction detecting optical system which is suitable to be used in a camera.

In order achieve the fourth object, an eye direction detecting optical system according to the present invention comprises a light source for emitting light which, as a parallel pencil of rays, is to be guided to a user's eye which views the optical system; an image receiving element on which a first Purkinje image based on a specular reflection of a cornea and a pupil image based on an eye fundus reflection are formed; and an imaging lens optical system for forming the first Purkinje image and the pupil image on the image receiving element.

A further object of the present invention is to provide an eye direction detecting optical system which is compact and easy to produce.

The above and other objects, novel features and advantages of the present invention will become more apparent from the description on the preferred embodiments with reference to the accompanying drawings.

BRIEF DESCRIPTION OF THE DRAWINGS

FIG. 3 is a schematic view for explaining focussing by means of the auto optical focus detecting device;

FIG. 4 is a schematic view of a detecting output of a CCD of the auto optical focus detecting device;

FIGS. 7 through 10 are illustrations for explaining a first embodiment of an auto optical focus detecting device of a single-lens reflex camera according to the present invention, wherein:

FIG. 7 is a perspective view schematically showing the arrangement of an auto focus optical system of the auto optical focus detecting device;

FIG. 8 is a plan view of a finder of the auto optical focus detecting device;

FIG. 9 is a schematic view for explaining the relationship between an exit pupil of a photographic lens of the single-lens reflex camera projecting light rays from a zone of the auto focus optical system which is optically conjugate with a center zone of the finder and an aperture or opening area;

FIG. 10 is a schematic view for explaining the relation between the exit pupil and the opening area when the pupil of FIG. 7 is subjected to vignetting;

FIGS. 11 through 20 are illustrations for explaining a second embodiment of an auto optical focus detecting device of a single-lens reflex camera according to the present invention, wherein;

FIG. 11 is a schematic view for explaining the relation between a lens having a short focal point and a lens having a long focal point;

FIG. 12 is a schematic view showing the overall constitution of a camera according to the second embodiment of the present invention;

FIG. 13 is a plan view showing a rotary member and an optical system of FIG. 12 in enlarged scale;

FIG. 14 is a side view snowing the rotary member in enlarged scale;

FIG. 15 is a vertical sectional view of the rotary member of FIG. 14;

FIGS. 16 through 18 are sectional views for explaining the configuration of a prism portion of FIG. 13;

FIGS. 19 and 20 are schematic views for explaining the function of the auto optical focus detecting device of a single-lens reflex camera according to the present invention;

FIGS. 21 through 23 are illustrations for explaining a third embodiment of an auto optical focus detecting device of a single-lens reflex camera according to the present invention, wherein:

FIG. 21 is a schematic view of means for automatically changing the angle of an optical axis for changing a central optical axis of a peripheral auto focus optical system and an optical axis of a photographic lens depending on whether the photographic lens has a long focal point or a short focal point;

FIG. 22 is a schematic view of an engaging hole of FIG. 21;

FIG. 23 is a schematic view for explaining the function of the means for automatically changing the angle of the optical axis;

FIGS. 24 through 37 are schematic views for explaining an eye direction detecting optical system for use in an auto optical focus detecting device of a single-lens reflex camera according to the present invention, wherein:

FIG. 24 is a schematic view for explaining the detecting principle of an eye direction detecting optical system according to the present invention and is a schematic view showing how a light spot is formed when a parallel pencil of rays are projected to a convex mirror;

FIG. 25 is a schematic view showing how a first Purkinje image is formed when a parallel pencil of rays are projected to the cornea of an eye;

FIG. 26 is an enlarged view of an eye for explaining the relation between the first Purkinje image and the center of the pupil;

FIG. 28 is a plan view of a finder of the auto optical focus detecting device;

FIG. 29 is a schematic view showing the relation among an eye direction detecting optical system and a finder magnifying lens used in an auto optical focus detecting device of a single-lens reflex camera according to the present invention and the user's eye;

FIGS. 30 and 31 are detailed illustrations of the eye direction detecting optical system;

FIG. 32 is an enlarged view of a reimaging lens of FIGS. 30 and 31;

FIGS. 33 is a schematic view of the eye direction detecting optical system;

FIG. 34 is a graph of a spherical aberration when a minifying lens of FIGS. 30 and 31 is not an aspherical lens;

FIG. 35 is a graph of a distorsion when the spherical aberration of FIG. 34 is present;

FIG. 36 is a graph of a spherical aberration when the minifying lens of FIGS. 30 and 31 is an aspherical lens;

FIGS. 37 is a graph of a distorsion when the spherical aberration of FIG. 36 is not present;

FIGS. 38 through 41 are schematic views for explaining a modified embodiment of the eye direction detecting optical system for use in the auto optical focus detecting device of a single-lens reflex camera according to the present invention, wherein:

FIGS. 38 and 39 are schematic views showing the relation among the reimaging lens and the finder magnifying lens of the eye direction detecting optical system for use in the auto optical focus detecting device of the camera according to the present invention, the user's eye and a one-dimentional line sensor; and FIGS. 40 and 41 are schematic views for explaining the inconvenience when the one-dimentional line sensor is used as a light receiving element of the eye direction detecting optical system.

DETAILED DESCRIPTION OF THE PREFERRED EMBODIMENT

Figure 1:
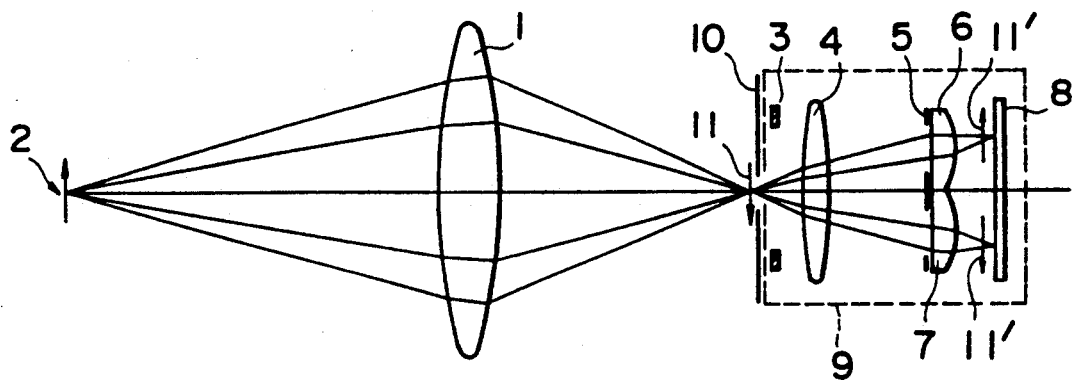
FIG. 1 is a schematic view of a conventional auto optical focus detecting device of a single-lens reflex camera.
Figure 2:
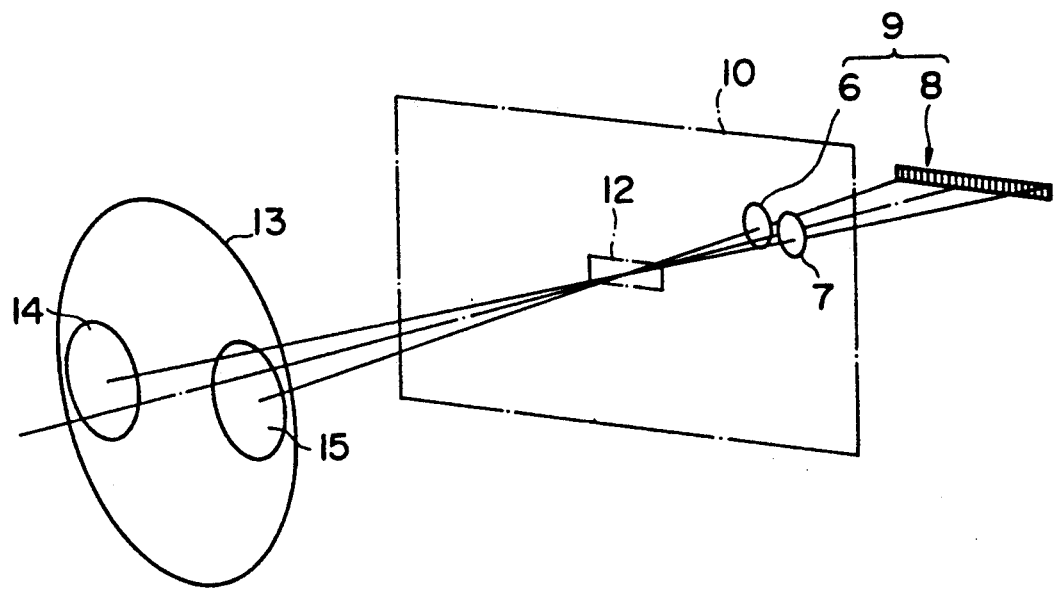
FIG. 2 is a perspective view schematically showing an arrangement of an auto focus optical system of FIG. 1.
Figure 5:
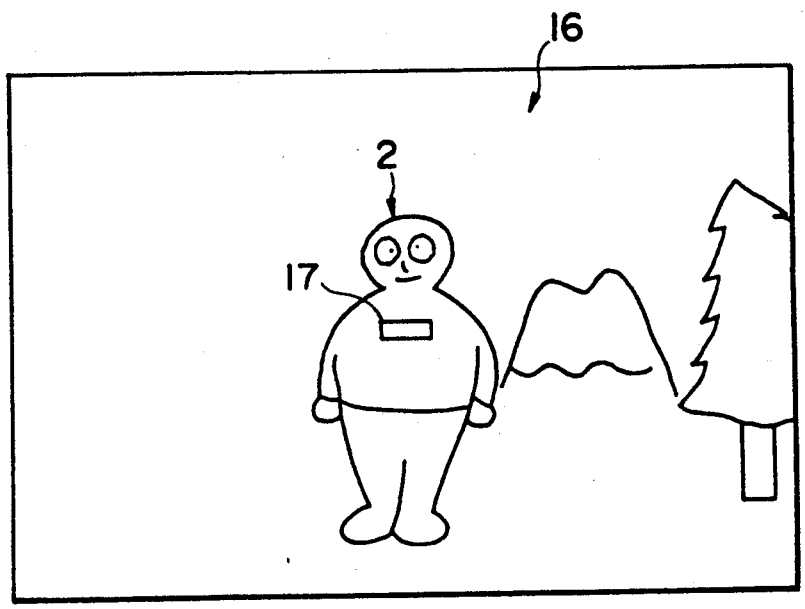
FIG. 5 is a schematic view for explaining an arrangement of a zone to a finder according to a conventional optical focus detecting device.
Figure 6:
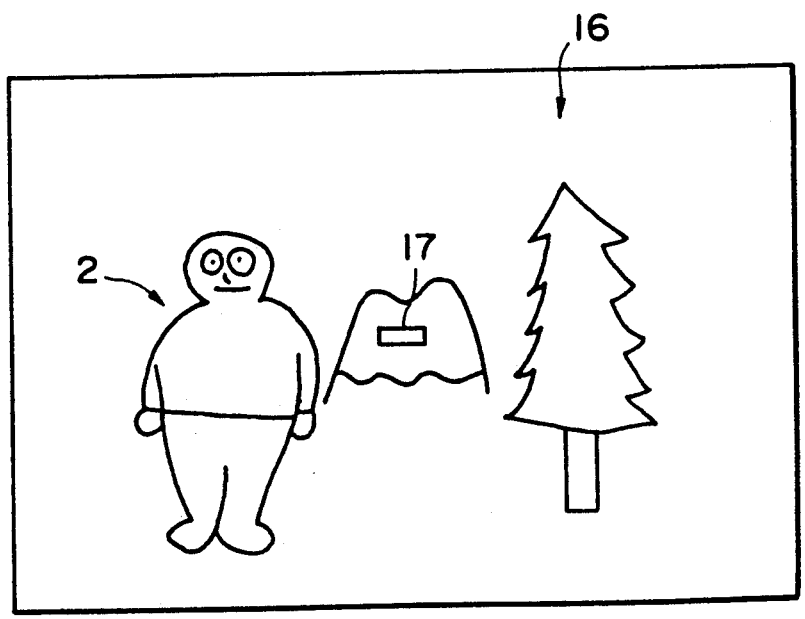
FIG. 6 is a schematic view for explaining the photographing procedure in order to obtain a photograph with a desired subject displaced to right and left areas from the center by using the conventional auto optical focus detecting device.
Figure 7:
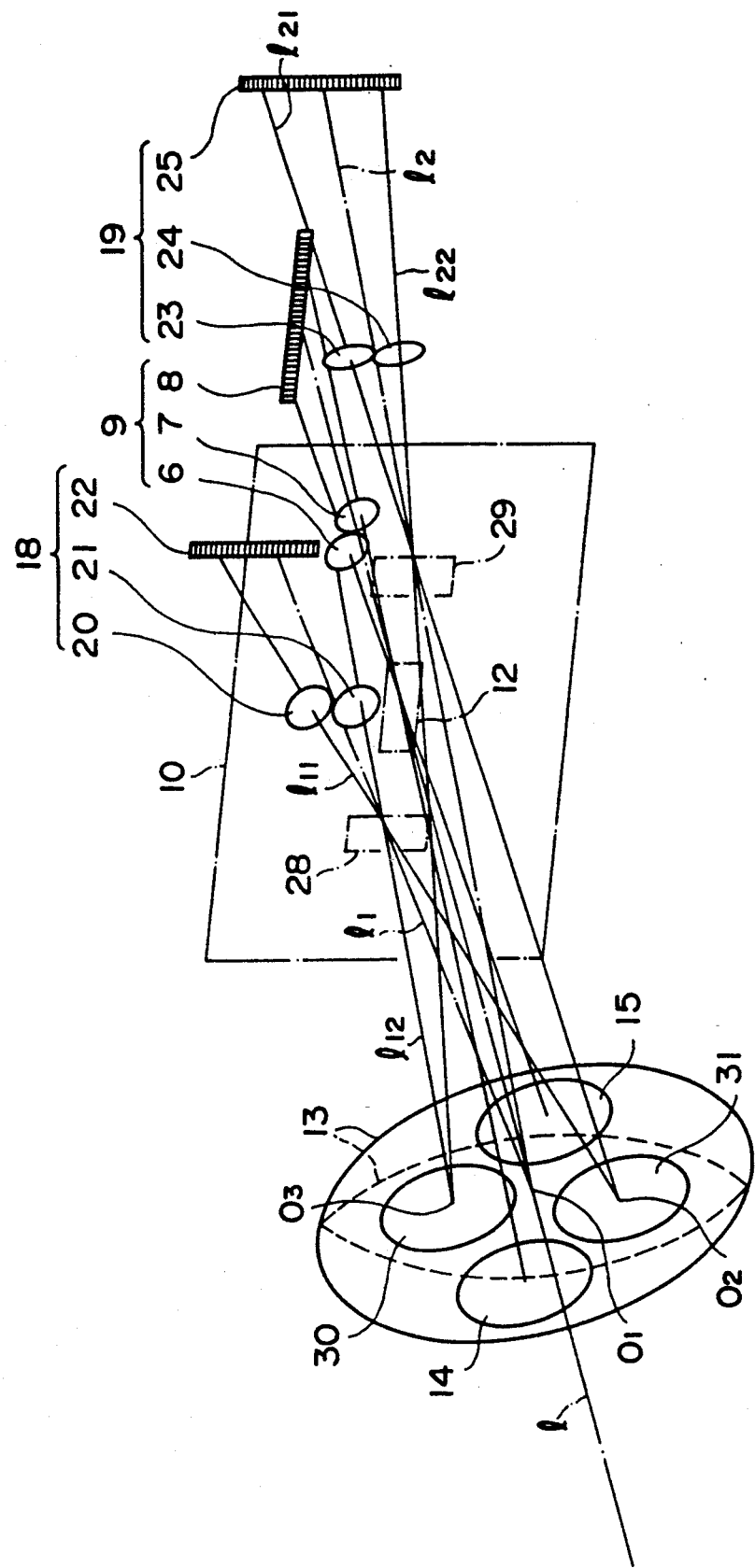
Figure 8:
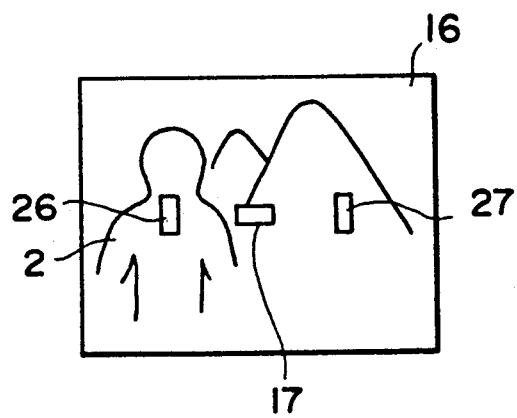
Figure 9:
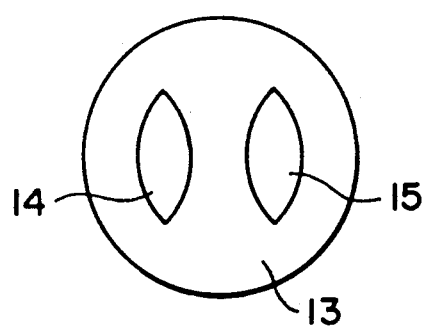

FIGS. 7 through 10 illustrate a first embodiment of an auto optical focus detecting device of a camera according to the present invention, in which the invention is applied to a single-lens reflex camera. FIG. 7 schematically illustrates an optical system of an auto optical focus detecting device of the single-lens reflex camera. In FIG. 7, identical component parts to those of the prior art are denoted by identical reference numerals. In FIG. 7, 13 denotes an exit pupil (one which is shown by a solid line) of a photographic lens 1 from which light rays project through a zone 12 of an auto focus optical system 9. The exit pupil 13 has a substantially circular shape as shown in FIG. 9. Opening areas 14 and 15 have a substantially elliptical shape, respectively, when projected through separator lenses 6 and 7.

In this first embodiment, the auto focus optical system 9 is provided at both sides thereof with peripheral auto focus optical systems 18 and 19 for finding an optical range to the peripheral area. The auto focus optical system 18 substantially comprises a pair of separator lenses 20 and 21 as a pair of image splitting optical elements, and a CCD 22. The other auto focus optical system 19 substantially comprises a pair of separator lenses 23 and 24 as a pair of image splitting optical elements systems, and a CCD 25.

A finder 16 mounted on a camera body, as shown in FIG. 8, is provided at both sides of a center zone 17 with peripheral zones 26 and 27 corresponding to the peripheral auto focus optical systems 18 and 19. The peripheral zones 26 and 27 are located in optically substantially conjugate positions with respect to the zones 28 and 29 of the auto focus optical systems 18 and 19.

Figure 10:
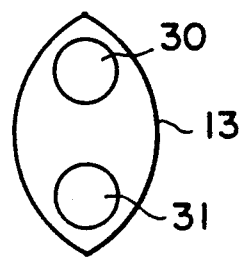

In FIG. 7, the separator lenses 20 and 21, and the separator lenses 23 and 24 are disposed in the vertical directions, respectively. The lenses 20, 21, 23 and 24 are located in optically substantially conjugate position with respect to the exit pupil 13 of the photographic lens 1 through a condenser lens 4 (not shown in FIG. 7) and opening areas 30 an 31 disposed in the vertical direction of the exit pupil 13 through the zones 28 and 29. In this way, the separator lenses 23 and 24 are disposed in the vertical direction for the following reasons. That is, a bundle of rays made incident to the zones 28 and 29 through the photographic lens 1 become an oblique bundle of rays. The exit pupil 13 of the photographic lens 1, when viewed through the zones 28 and 29, exhibits a flattened shape, as shown in FIG. 10, due to vignetting. Therefore, if the opening areas 30 and 31 are disposed in the horizontal direction, the base line length between the lenses of the separator lenses 20 and 21 (separator lenses 23 and 24) can not be obtained long enough. The result is that the lens capacity becomes poor and the detection accuracy on an image distance becomes poor.

In FIG. 7, 1 denotes an optical axis of the photographic lens 1, $l_1$ a center optical axis of the auto focus optical system 18 and $l_2$ a center optical axis of the auto focus optical system 19. The center optical axes $l_1$ and $l_2$ intersect at the center $O_1$ of the exit pupil 13. $l_{11}$ denotes an optical axis of the separator lens 20, $l_{12}$ an optical axis of the separator lens 21, $l_{21}$ an optical axis of the separator lens 23 and $l_{22}$ an optical axis of the separator lens 24. The optical axes $l_{11}$ and $l_{21}$ intersect at the center $O_2$ of the opening area 31, whereas the optical axes $l_{12}$ and $l_{22}$ intersect at the center $O_3$ of the opening area 30.

In this way, the peripheral zones 26 and 27 are disposed at both sides of the center zone 17 of the finder 16, and the peripheral auto focus optical systems 18 and 19 are disposed corresponding to the peripheral zones 26 and 27. Then, if the CCDs 8, 22 and 25 corresponding to zones 17, 26 and 27 (see FIG. 8) which are to be selected, are driven, the distance to a subject 2 to be photographed can be automatically found by the auto focus optical systems 9, 18 and 19 corresponding to the selected one of the zones 17, 26 and 27. In that case, the zones 17, 26 and 27 are manually or automatically selected.

Next, a second embodiment of an auto optical focus detecting device of a single-lens reflex camera according to the present invention will be described with reference to FIGS. 11 through FIG. 20.

Figure 12:
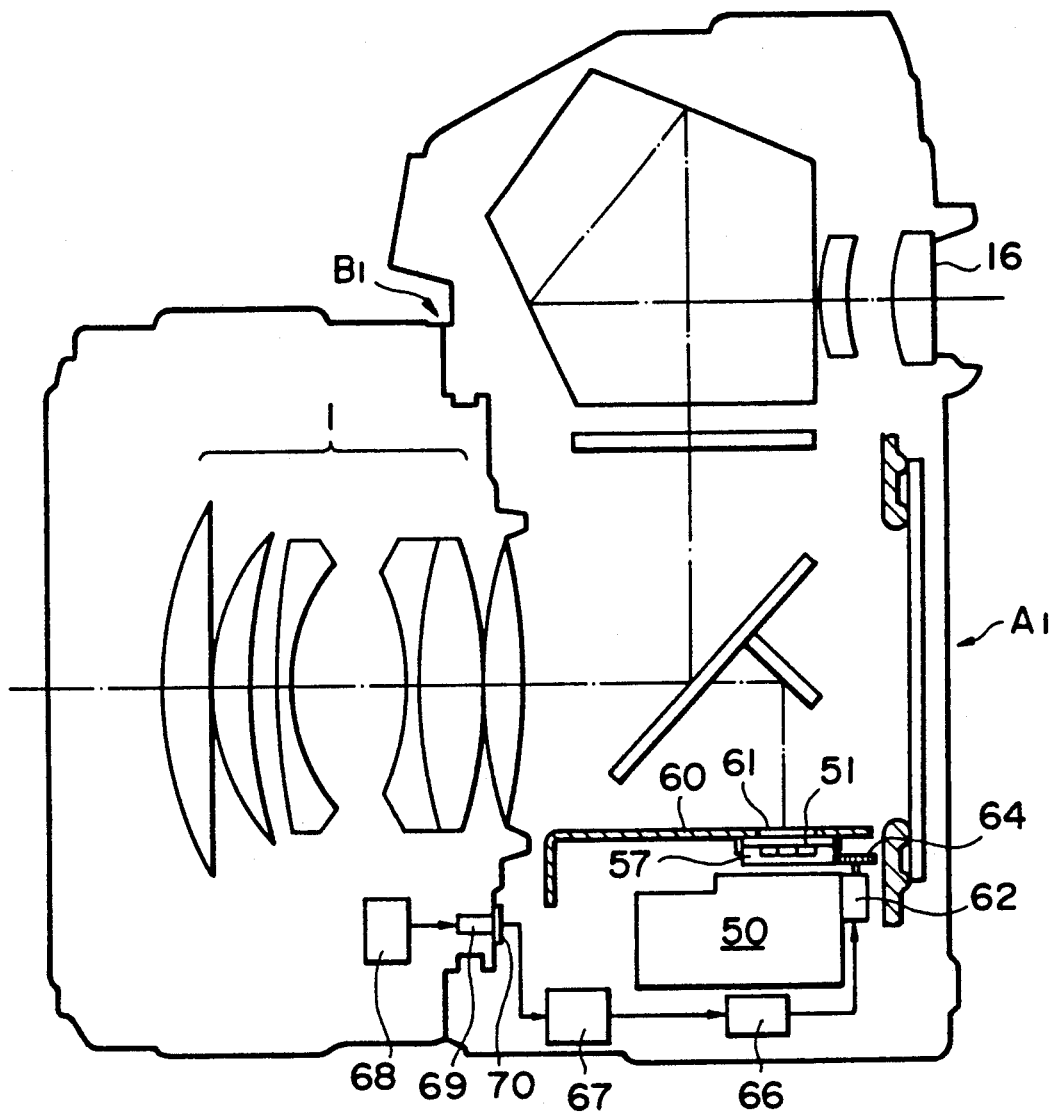
Figure 19:
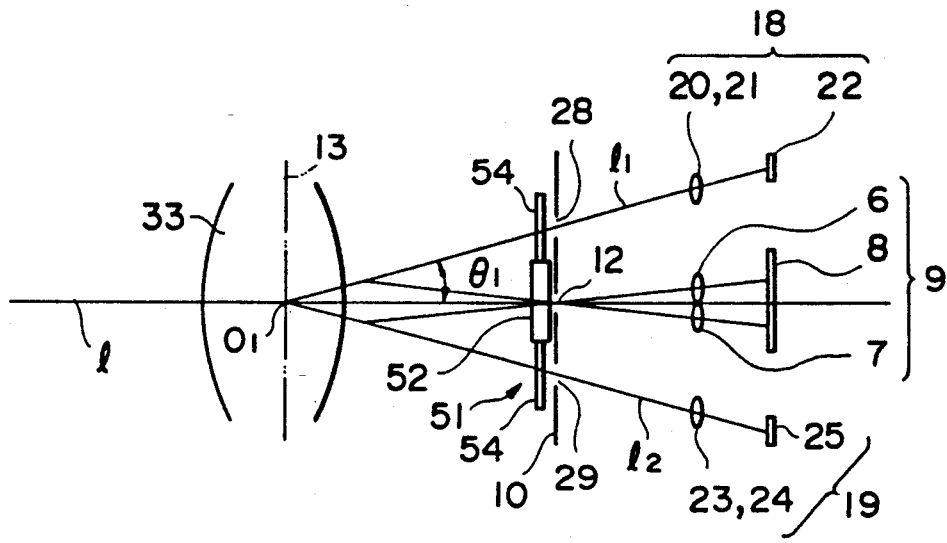
Figure 20:
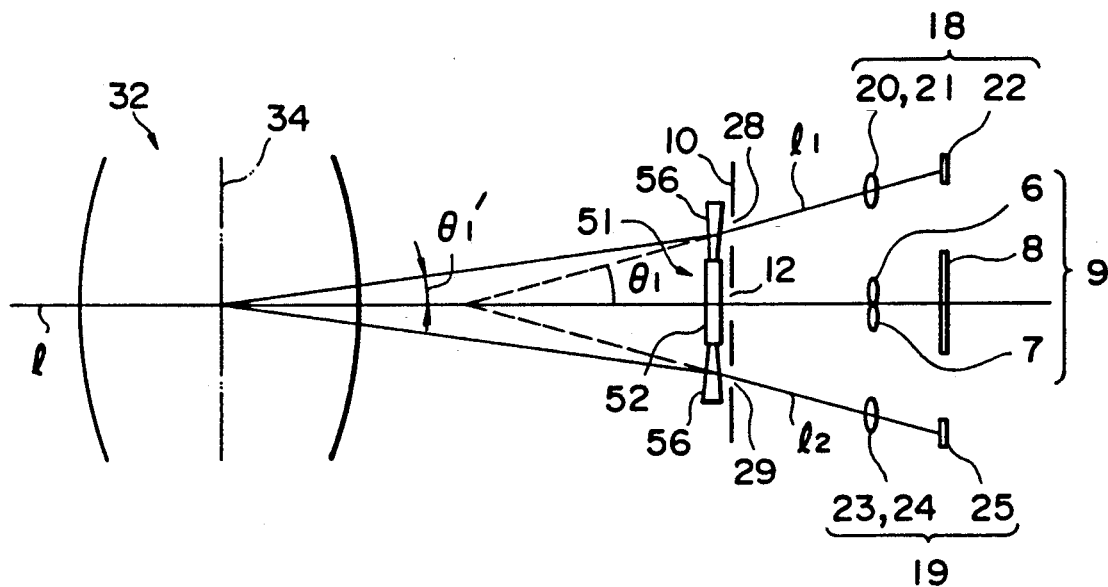

In general, an interchangable lens mount $B_1$ is attachable to and detachable from a camera body $A_1$ as shown in FIG. 12. Two cases will be considered, one case is that the photographic lens 1 mounted on the lens mount $B_1$ is a lens 32 having a long focal point as shown in FIG. 20, and the other case is that the photographic lens 1 is a lens 33 having a short focal point as shown in FIG. 19.

Figure 11:
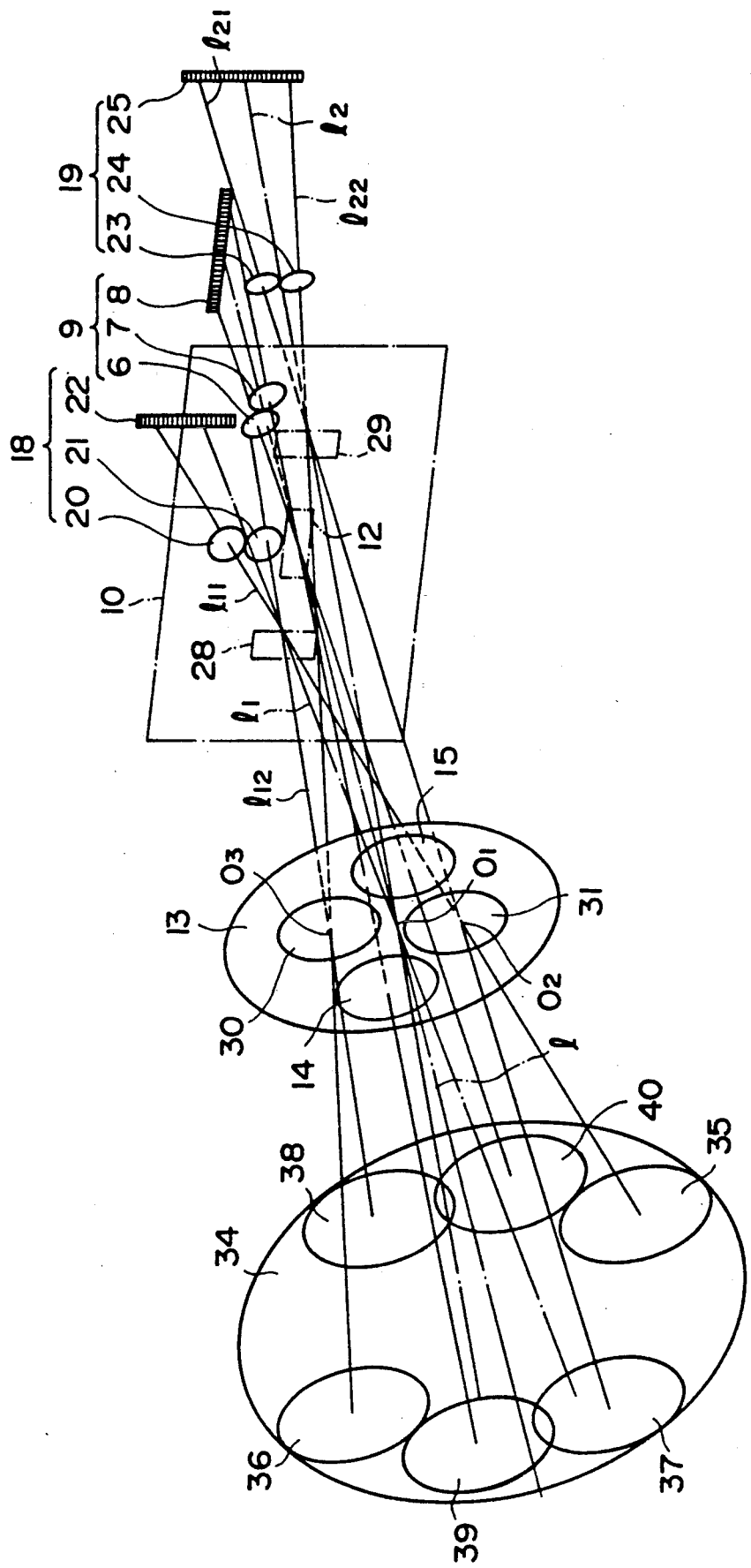

In this case, the optical axes $l_1$ and $l_2$ of the peripheral auto focus optical systems 18 and 19, in general, are different in angles $O_1$ and $\theta'_1$ which are formed between the optical axes $l_1$ and $l_2$ and the optical axis 1. As shown in FIG. 11, by taking into consideration the problem of vignetting when the opening areas 35 and 38 of the exit pupil 34 of the photographic lens 1 comprising a lens 32 having a long focal point are viewed through the separator lenses 20 and 21 of the auto focus optical system 18 and when the opening areas 36 and 37 of the exit pupil 34 are viewed through by the separator lenses 23 and 24 of the auto focus optical system 19, the angles of the separator lenses 20, 21, 23 and 24 with respect to the exit pupils 13 and 34 of the photographic lens 1 must be changed depending on whether the photographic lens 1 is the lens 33 having a short focal point or the lens 32 having a long focal point, and the optical axis 1 of the photographic lens 1 and the optical axes $l_1$ and $l_2$ of the auto focus optical systems 18 and 19 must be different. In FIG. 11, reference numerals 39 and 40 denote opening areas of an exit pupil 34 when optically aligned with the separator lenses 6 and 7.

Figure 13:
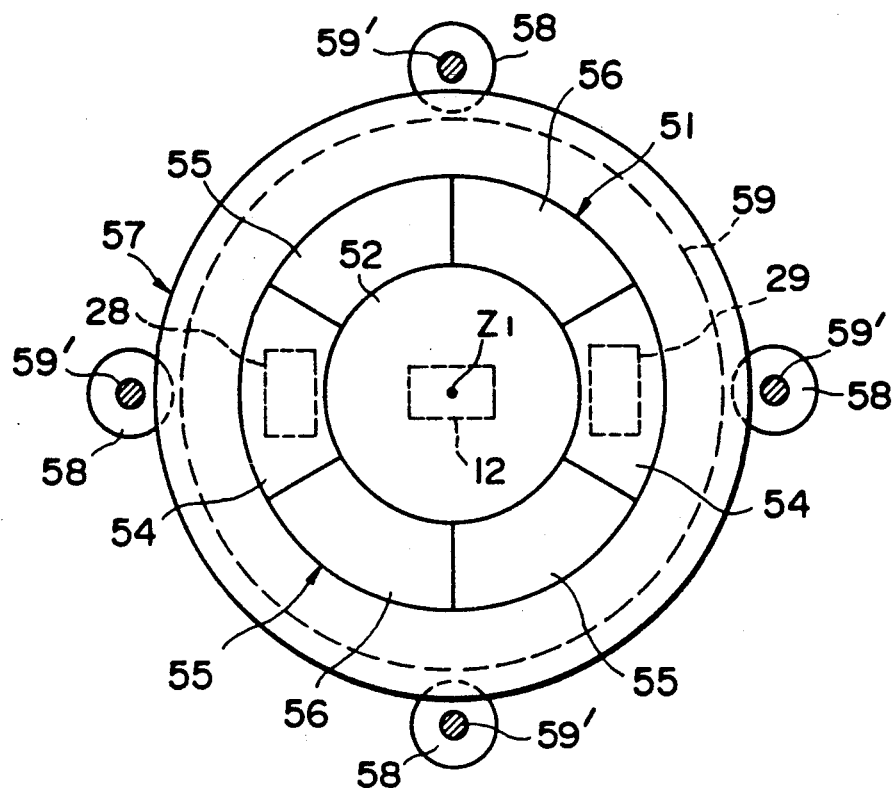
Figure 15:
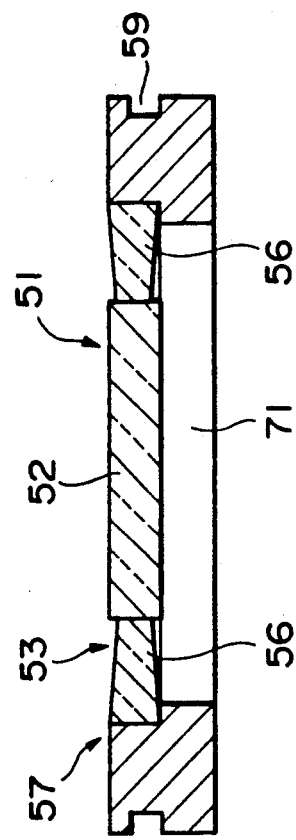

As shown in FIG. 12, in front of an auto focus unit 50 built in a camera body $A_1$ and constituting the auto focus optical systems 9, 18 and 19, there is provided an optical member 51 for changing the angles of optical alignment of the separator lenses 20, 21, 23 and 24 of the peripheral auto focus optical systems 18 and 19 with respect to the photographic lens 1. In other words, there is provided the optical member 51 for changing the angles so that the direction of the bundle of rays taken in the auto focus optical systems 18 and 19 is brought to be faced in the direction of the exit pupil of the photographic lens 1. The optical member 51, as shown in FIGS. 13 and 15, has a cylindrical plate shape. The optical member 51 is integrally molded of, for example, a plastic material.

Figure 18:
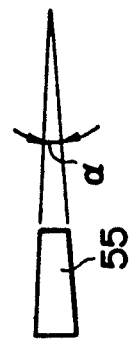
Figure 17:
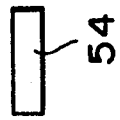
Figure 16:

The optical member 51 comprises a central transparent portion 52 having an equal thickness adjacent to the auto focus optical system 9, and a prism portion 53 formed in an annular shape around the central transparent portion 52 having an equal thickness. The prism portion 53, as shown in FIGS. 16 through 18, includes transparent portions 54 each having an equal thickness, and prisms 55 and 56. The prisms 55 and 56 have a thicker outer diameter side compared with the inner diameter side, respectively. The apex angles of the prisms 55 and 56, as shown in FIGS. 16 and 18, are different from each other. The function of the prism portion 53 will be described. Next, a rotary member 57 for supporting the optical member 51 will be described.

Figure 14:
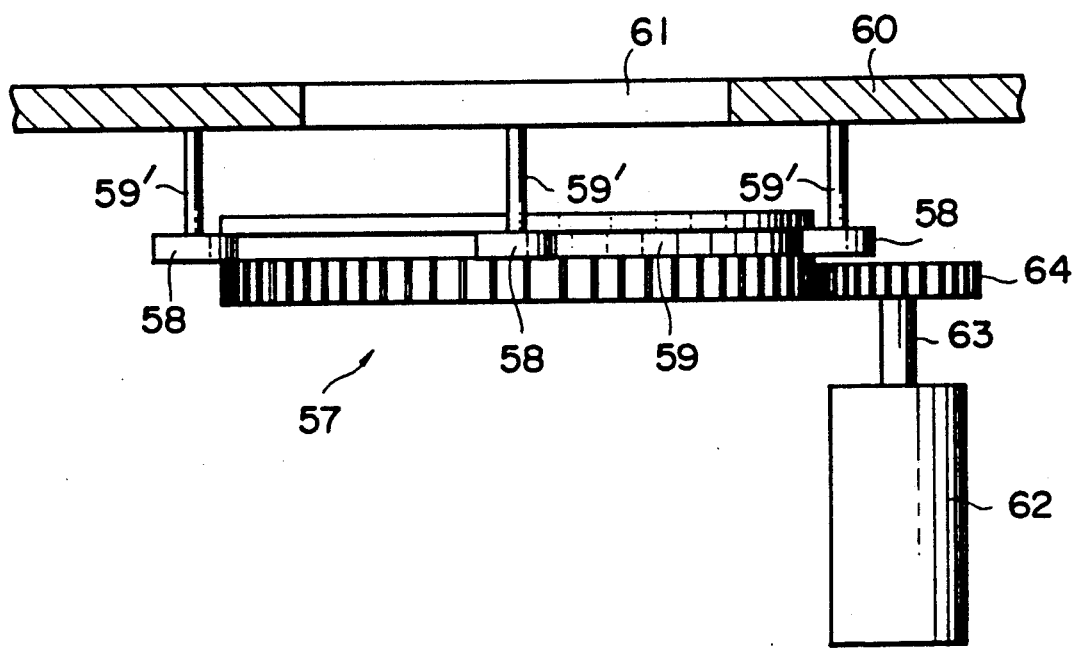

In this embodiment, the rotary member 57, as shown in FIG. 13, is rotatably carried on four rollers 58. The rotary member 57, as shown in FIG. 14, formed at the outer periphery thereof with a guide groove 59 for guiding the rollers 58. In this embodiment, the rollers 88 are rotatably supported by a supporting shaft 59', respectively. The supporting shaft 59' is attached to, for example, a douser 60. Reference numeral 61 denotes an opening formed in the douser 60.

The rotary member 57 is driven by a motor 62. The rotary member 57 is provided at an outer peripheral portion thereof with a gear portion 65 for meshing with a gear 64 mounted on an output shaft 63 of the motor 62. The motor 62 is driven by a motor driver 66 which is controlled by a command from a microprocessor 67. Upon receipt of information of a lens ROM 68 provided to an interchangeable lens mount $B_1$, the microprocessor 67 controls the motor driver 66. In FIG. 12, 69 denotes a connecting pin provided to the lens mount $B_1$, and 70 denotes a connecting terminal provided to the camera body $A_1$. In FIG. 15, 71 denotes an opening.

In this embodiment, when the lens mount $B_1$ having the lens 33 with a short focal point is attached to the camera body $A_1$, the microprocessor 67 drive controls the motor 62 so as to bring the transparent portion 54 having an equal thickness to face with zones 28 and 29 as shown in FIG. 19. On the other hand, when the lens mount $B_1$ having the lens 32 with a long focal point is attached to the camera body $A_1$, the microprocessor 67 drive controls the motor 62 so as to bring the prism 56 to be faced with the zones 28 and 29 as shown in FIG. 20. Then, the microprocessor 67 stops the rotation of the rotary member 57 in that position.

By this, the angles of the separator lenses 20, 21, 23 and 24 of the peripheral auto focus optical systems 18 and 19 for with respect to the exit pupil of the photographic lens 1 are automatically charged.

That is, for example, when the lens mount $B_1$ having the lens 33 of a snort focal point is detached from the camera body $A_1$ and when the lens mount $B_1$ having the lens 32 of a short focal point is attached to the camera body $A_1$, the optical member 51 is rotated about an imaginary center $Z_1$ (see FIG. 13) and the prism 56 is stopped in a position facing the zones 28 and 29. By this, the angles of the separator lenses 20, 21, 23 and 24 with respect to the exit pupil of the photographic lens 1 are automatically changed from $\theta_1$ to $\theta'_1$. When the prism 55 is brought to be faced with the zones 28 and 29, the angles of the separator lenses 20, 21, 23 and 24 with respect to the exit pupil of the photographic lens 1 are changed to those other than $\theta_1$ and $\theta'_1$ so as to be well fitted to a photographic lens having other focal point.

In the afore-mentioned embodiment, upon receipt of information of the lens ROM 68 provided to the lens mount $B_1$, the microprocessor 67 drive controls the motor 62. However, even if the information of the lens ROM 68 is unavailable, the rotary member 57 may be continuously rotated by the microprocessor 67 as soon as the lens mount $B_1$ is attached to the camera body $A_1$. Then the rotary position where the light receiving quantity of the CCDs 22 and 25 becomes maximum may be detected by the microprocessor 67, and then the rotation of the rotary member 57 may be stopped in that rotary position, so that the angles of the separator lenses 20, 21, 23 and 24 with respect to the exit pupil of the photographic lens 1 are automatically changed from $\theta_1$ to $\theta_1'$.

In the afore-mentioned embodiment, two prisms are employed. However, the present invention is not limited to this.

According to this embodiment, the zone of the auto focus optical system is disposed in an optically substantially conjugate position with respect to the center zone of the finder provided to the camera body $A_1$, and a zone is disposed in the peripheral portion of the center zone of the finder. A zone of the peripheral auto focus optical system is located in an optically substantially conjugate position within the camera body with respect to the peripheral zone. When a photograph with a desired subject not in the center is to be obtained, the distance to the subject to be photographed can be automatically found using the peripheral auto focus optical system without necessitating a troublesome photographing procedure. When the photographic lens is focussed by moving the photographic lens mounted on the lens mount, the direction of the bundle of rays automatically taken in the peripheral auto focus optical system can be regulated and established so as to face in the direction of the exit pupil of the photographic lens according to the mounting of a lens to the camera body.

Figure 22:
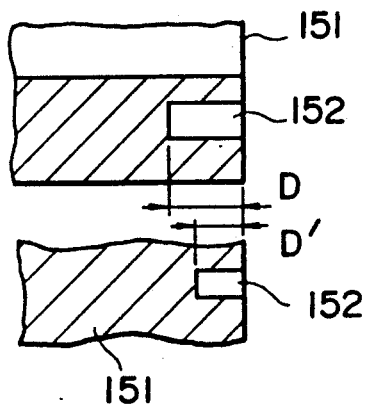
Figure 23:
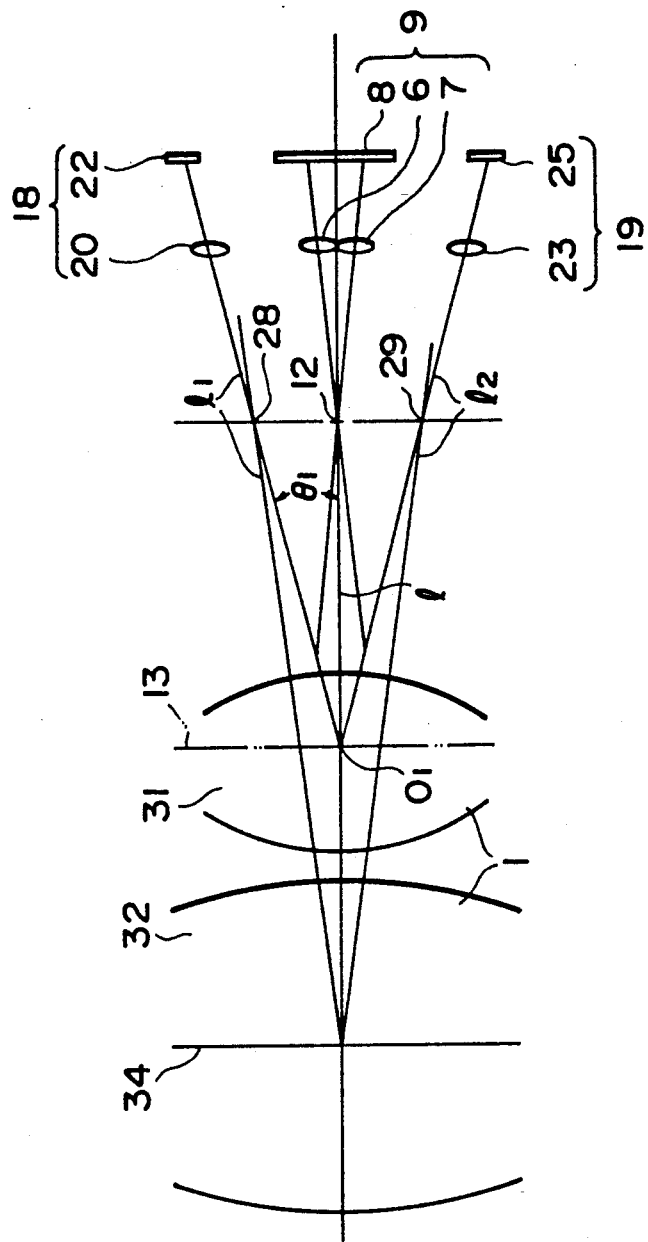

Next, a third embodiment of an auto optical focus detecting device of a single-lens reflex camera according to the present invention will be described with reference to FIGS. 21 through 23.

Figure 21:
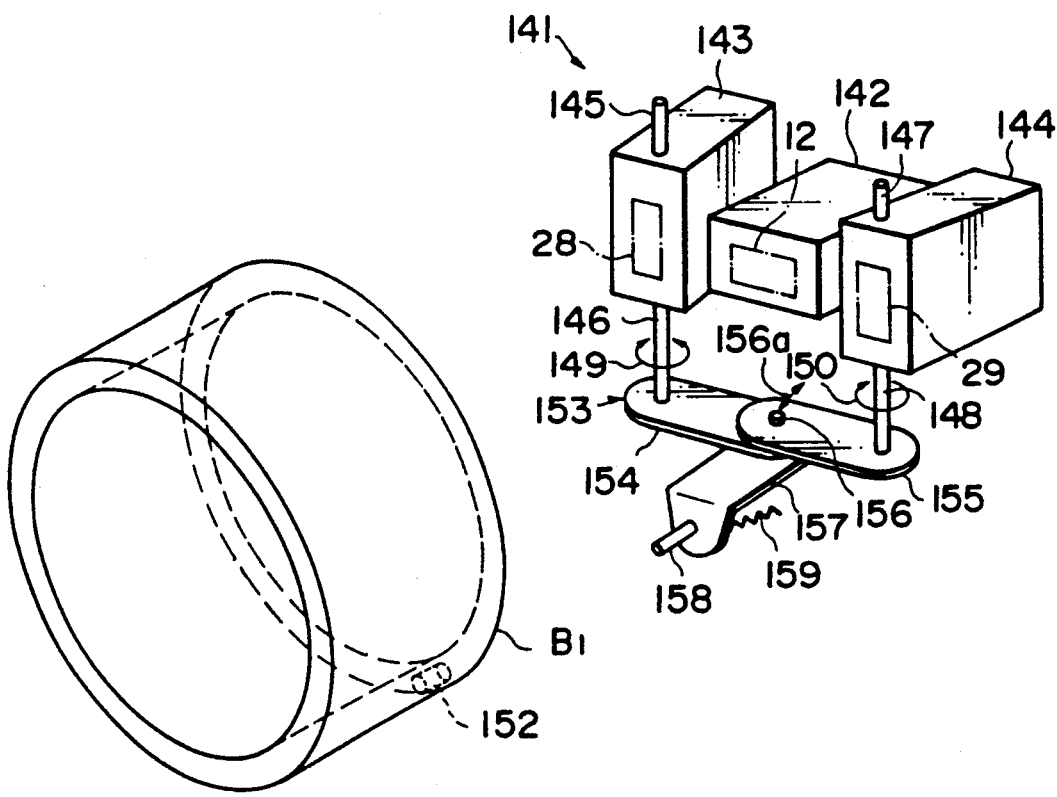

In the illustrated embodiment of FIG. 21, the angle formed between the optical axis 1 of the photographic lens 1 and the optical axes $l_1$ and $l_2$ of the auto focus optical systems 18 and 19 is changed by mechanical means. Reference numeral 141 denotes means for automatically changing the angle of the optical axis.

In FIG. 21, the camera body $A_1$ is provided with a holding case 142 secured to a predetermined position thereof. The camera body $A_1$ is further provided with holding cases 143 and 144 disposed to both sides of the holding case 142. The holding case 142 contains the unit of the auto focus optical system 9. On the other hand, the holding cases 143 and 144 contain the units of the auto focus optical systems 18 and 19, respectively.

The means 141 for automatically changing the angle of the optical axis includes a pair of supporting shafts 145 and 146 coaxially secured to the upper and lower surfaces of the holding case 143 in the figure, and a pair of supporting shafts likewise coaxially secured to the upper and lower surfaces of the holding case 144 in the figure. These supporting shafts 145 and 146, and 147 and 148 are held by a supporting plate (not shown) of the camera body $A_1$ in such a fashion as to be parallel to the film eqivalent plane 10 and able to move in the right and left direction of FIG. 21. These shafts 145 and 146, and 147 and 148 are also rotatable about an axis, respectively. By this, the holding cases 143 and 144 are able to move to and fro with respect to the holding case 142 and are also able to rotate about the supporting shafts 145 and 146, and 147 and 148 as shown by arrows 149 and 150.

Furthermore, the means 141 for automatically changing the angle of the optical axis is provided with mechanical drive means 153 (associatedly moving mechanical means) which is engaged in an engaging hole (engaging portion) 152 provided to the lens mount $B_1$ of the photographic lens 1 when the lens mount $B_1$ is attached to the camera body $A_1$ so as to rotate the supporting shafts 146 and 148 according to the focal distance of the photographic lens 1 and to bring the optical axes $l_1$ and $l_2$ of the peripheral auto focus optical systems 18 and 19 and the zones 28 and 29 to face the center of the exit pupil of the photographic lens 1.

The mechanical drive means 153 includes links 154 and 155 one ends of which are secured to lower end portions of the supporting shafts 146 and 148, and a supporting shaft 156 for rotatably connecting the other ends of the links 154 and 155 with each other. The supporting shaft 156 is disposed as such that the axis thereof is perpendicular to the optical axis 1 and is held by the camera body $A_1$ in such a fashion as to be moved to and fro in a direction as shown by an arrow 156$a$, i.e., in the direction of the optical axis 1. Further, the mechanical drive means 153 includes a drive link 157 one end of which is rotatably held by the supporting shaft 156, an engaging pin 158 provided to the other end portion of the drive link 157 and projecting outward from the camera body $A_1$, and a spring 159 for energizing the drive link 157 in the opposite direction to the supporting shaft 156, i.e., in the direction toward which the engaging pin 158 projects outward from the lens mount (not shown) of the camera body $A_1$.

When the lens mount $B_1$ of the photographic lens 1 is attached to the camera body $A_1$, the engaging pin 158 is inserted into the engaging hole 152 and the foremost end of the engaging pin 158 is abutted against the bottom portion of the engaging hole 152. This engaging pin 158 is reciprocally movable in parallel relation with the optical axis 1. The engaging hole (engaging portion) 152 in which the engaging pin 158 is engaged is designed as such that the more the focal distance of the photographic lens 1 is short, the more the depth D of the engaging hole 52 is shallow. Furthermore, the depth of the engaging hole 152 is established as such that when the lens mount $B_1$ of the photographic lens 1 is attached to the camera body $A_1$ to permit the engaging pin 158 to be inserted into the engaging hole 152, the optical axes $l_1$ and $l_2$ of the peripheral auto focus optical systems 18 and 19 and the zones 28 and 29 thereof are brought to be faced toward the center of the exit pupil of the photographic lens 1 through the mechanical drive means 153. FIG. 22(A) illustrates one example of the depth D of the engaging hole 52 when the photographic lens 1 has a long focal point, whereas FIG. 22(B) illustrates another example of the depth D of the engaging hole 152 when the photographic lens 1 has a short focal point.

Therefore, when the lens mount $B_1$ of the photographic lens 1 is attached to the camera body $A_1$, the engaging pin 158 is brought to be engaged with the engaging hole 152, the projecting amount of the engaging pin 158 from the camera body $A_1$ is changed by the engaging hole 152 according to the focal point of the photographic lens 1, and the drive link 157 is moved to and fro in the direction of the optical axis 1. By this, the links 154 and 155 are pivoted about the axes of the supporting shafts 146 and 148. Then, the holding cases 143 and 144 are pivoted about the supporting shafts 146 and 148 and, at the same time, the supporting shafts 146 and 148 are move toward or away from each other. As a result, the pivotal end portions of the holding cases 143 and 144, i.e., the sides where the zones 128 and 129 are located, move toward or away from each other. As a result, the optical axes $l_1$ and $l_2$ of the peripheral auto focus optical systems, 18 and 19 and the zones 28 and 29 are automatically faced toward the center of the exit pupil of the photographic lens 1.

As described in the foregoing, according to an auto optical focus detecting device of a single-lens reflex camera of this embodiment, the zone of the auto focus optical system is located in an optically substantially conjugate position with respect to the center zone. The photographic lens removably attached to the camera body is moved by the output of the light receiving element of the auto focus optical system in order to focus the photographic lens. Other peripheral zones are located at both sides of the center zone of the finder. The zone of the peripheral auto focus optical system is located in an optically substantially conjugate position with respect to the peripheral zone. The optical axes of the both peripheral auto focus optical systems and the zones thereof are brought to be substantially faced toward the center of the exit pupil of the photographic lens by the engaging portion provided to a mirror cylinder of the photographic lens and the mechanical associatedly moving means actuated by the engaging portion when the photographic lens is attached to the camera body. Due to the foregoing arrangement, when a photograph with a subject not positioned in the center thereof is to be obtained, such photograph can be taken rapidly by automatically finding the distance to the subject using the peripheral auto focus optical system. Thus, a troublesome photographing procedure is no longer required. This is also true when a photographic lens having a different focal point is used. In that case, the optical axis of the peripheral auto focus optical, system is automatically brought to faced toward the center of the exit pupil of the photographic lens by the mounting action of the photographic lens to the camera body. Thus, the problem of vignetting can be automatically removed.

Next, an eye direction detecting optical system which is used in an auto optical focus detecting device of a single-lens reflex camera according to the present invention will be described with reference to FIGS. 24 through 37.

A method for detecting an eye direction is described, for example, in an article under the title of "Psychological Physic of Vision" written by Mitsuo Ikeda. When it is applied to a camera, only the direction of the user's eye must be detected. In other words, the parallel movement of the user's eye with respect to a view finder of a camera should not be detected. The reasons are as follows. In case the parallel movement of the eye is detected together with the detection of the eye direction, the information on the eye direction is overlapped on that of the angular direction. Therefore, it would be difficult for the camera to sense which zone the user is looking. If an eye direction detecting optical system which is also able to detect the parallel movement is employed, the relative distance between the optical axis of the finder of the camera and the revolving center of an eye ball of the user must be maintained constant. However, in view of the popularity of hand held type cameras, this is practically impossible since the eye is relatively trembled sideward with respect to the finder 16.

An eye direction detecting optical system for detecting the eye direction only in the angular direction is introduced, for example, in "Optical Engineering" of 1974, ∤ Montn, Vol. 23, No. 4, P339-P342, Subtitle "Fixation Point Measurement by the Oculometer Technique".

Figure 24:
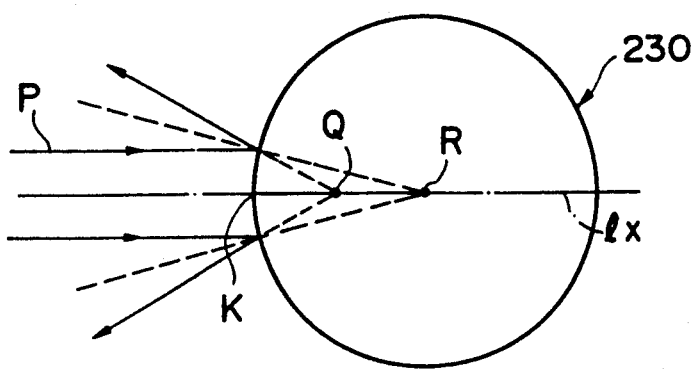
Figure 25:
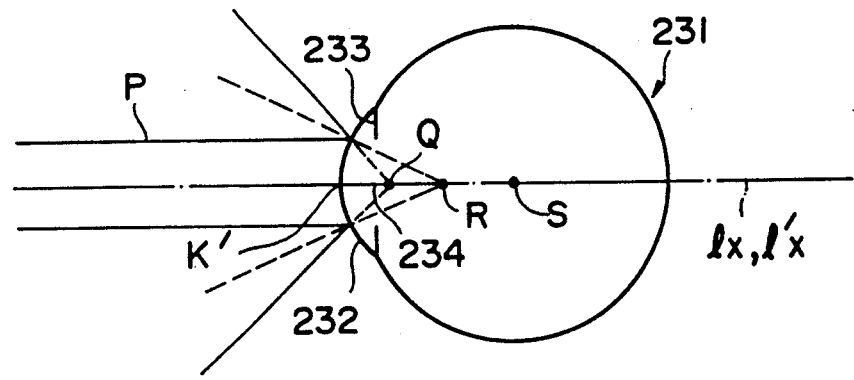

The principle of an eye direction detecting optical system introduced in this article is that, when a parallel pencil of rays P parallel to an optical axis $l_x$ is radiated to a convex mirror 230 as shown in FIG. 24, an image of a light source located in an optically infinite distance is produced as a light point at a middle point Q between a center R of curvature of the convex mirror 230 and an intersecting point K where the optical axis $l_x$ intersects the mirror surface. When the parallel pencil of rays parallel to the optical axis $l_x$ is radiated to a cornea 232 of a human eye 231 as shown in FIG. 25, an image of a light source located in an optically infinite distance is also produced as a light point (this light point is hereinafter referred to as "first Purkinje image PI") at the middle point Q between the center R of curvature of the cornea 230 and a corneal vertex K'. 233 denotes an iris, 234 denotes the center of a pupil, and reference character S denotes the revolving center of an eye ball.

Figure 26:
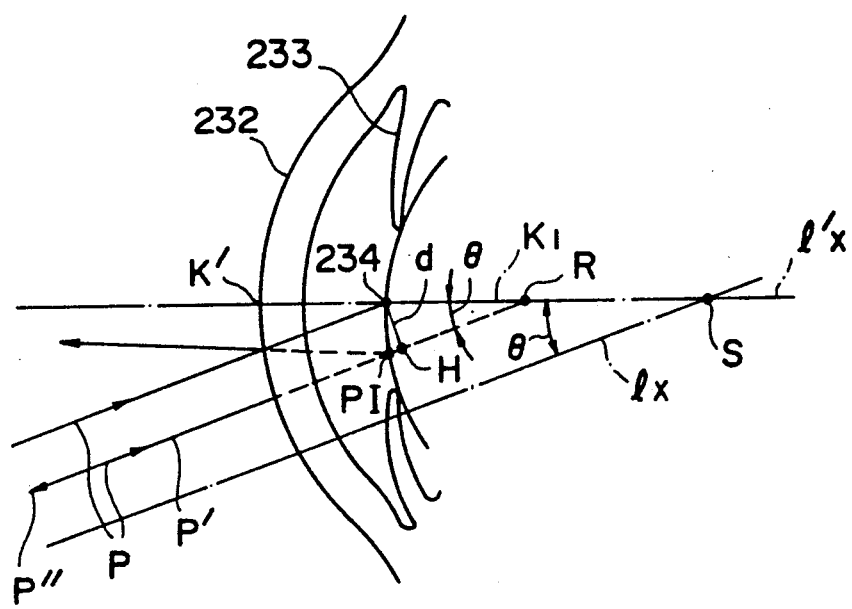

When the optical axis $l_x$ of the bundle of rays P illuminating the cornea 232 is in alignment with the eye direction $l_x$ showing the direction of the human eye, the center 234 of the pupil, the first Purkinje image PI, the center R of curvature of the cornea 232, and the revolving center S of the eye ball are located on the optical axis $l_x$. Regarding the camera, it is impossible to assume that the revolving center S of the eye ball is located on the optical axis $l_x$ of the view finder. However, it is presumed here that the revolving center S of the eye ball is located on the optical axis $l_x$ and the eye ball is sidewardly revolved about the revolving center S. Then, as shown in FIG. 26, a relative gap is produced between the center 234 of the pupil and the first Purkinje image PI. Further, it is presumed that the eye is revolved by an angle $\theta$ with respect to the optical axis $l_x$ and the length of the perpendicular line extending from the center 234 of the pupil to the ray of light which is made incident perpendicularly to the cornea 232 is denoted by d. The following relation can be obtained;

$$d = k_1 \cdot \sin \theta \qquad (1)$$

wherein $k_1$ is a distance from the center 234 of the pupil to the center R of curvature of the cornea 232. Although there are individual differences, according to MIL-HDBK-141 "OPTICAL DESIGN" editted by the U.S. Department of Defense, the distance $k_1$ is about 4.5 mm. Reference character H denotes an intersecting point where the perpendicular line extending from the center 234 of the pupil to the ray of light P' which is made perpendicularly incident to the cornea 232 intersects the ray of light P'.

As apparent from the above relation (1), since the distance $k_1$ is known, if the length d is found, the revolving angle $\theta$ can be obtained.

In view of the fact that the intersecting point H and the first Purkinje image PI are located on the ray of light P', the parallel pencil of rays P are radiated toward the cornea 232 and if the ray of light P" reflected and returned in the direction parallel to the incident bundle of rays among the specular reflection from the cornea 232 is detected, and if the relation between the center 234 of the pupil and the first Purkinje image PI is found, the revolving angle $\theta$ of the eye can be obtained.

Figure 27A:
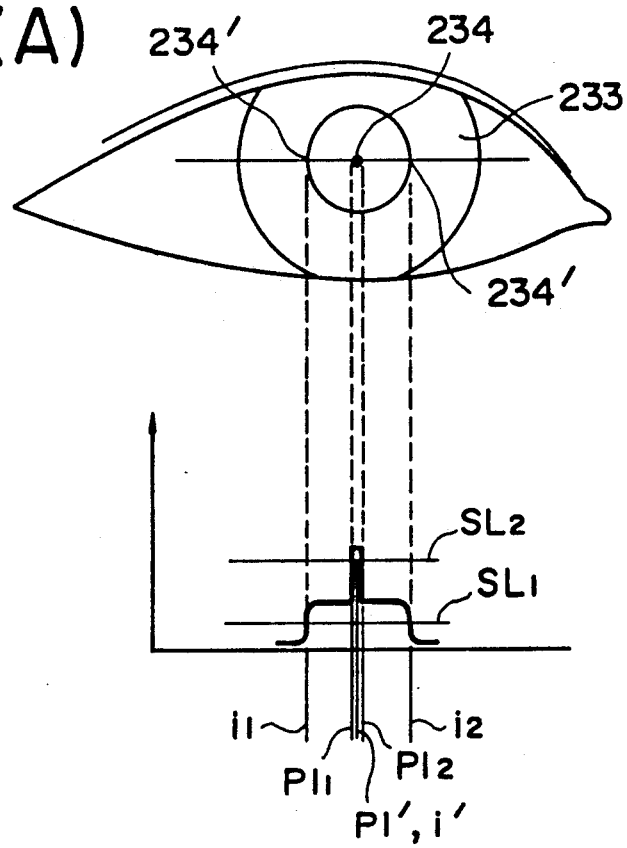
FIGS. 27(A) and 27(B) are schematic views for obtaining the eye direction from the first Purkinje image and the center of the pupil by arithmetic operation.
Figure 27B:
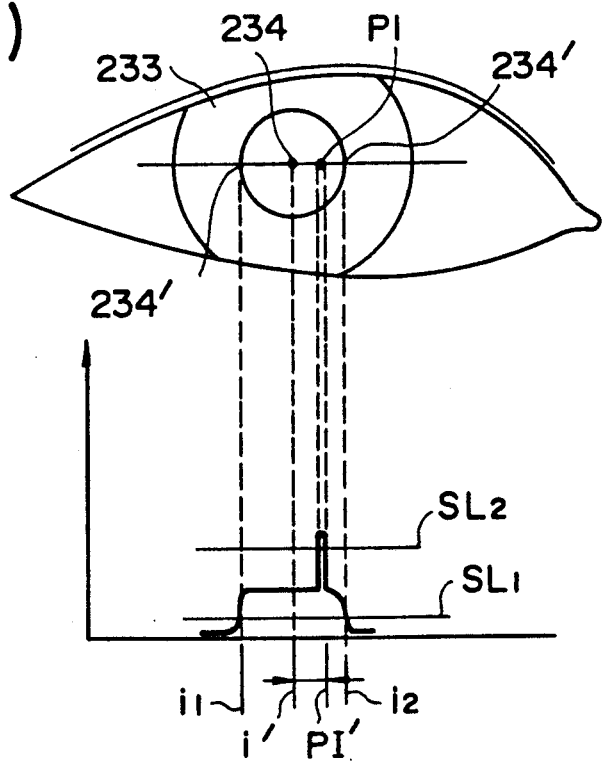

Therefore, the parallel pencil of rays P are projected to the eye. And, if the periphery 234' of the pupil appeared as a silhouette based on the light reflected by the eye fundus and the first Purkinje image PI are imaged on the light receiving element such as, for example, solid photosensitive element as shown in FIGS. 27(A) and 27(B), the output of the received light has the peak at the place corresponding to the first Purkinje image on the light receiving element and the place corresponding the light reflected by the eye fundus becomes a trapezoidal shape. Therefore, the coordinates $i_1$, $i_2$ corresponding to the peripheries 234' of the pupil are found by a slice level $SL_1$. Then, the coordinates $PI_1$, $PI_2$ corresponding to the first Purkinje image PI are found by a slice level $SL_2$. Then, a difference $d' = PI' - i'$ between the coordinates i' and the coordinates PI' corresponding to the center 234 of the pupil is calculated from the relations (2) and (3) set forth hereunder. If the power of the detecting optical system is denoted by m here, the distance d can be found from the following relation (4):

$$i' = (i_1 + i_2)/2 \quad (2)$$

$$PI' = (PI_1 + PI_2)/2 \quad (3)$$

$$d = d'/m \quad (4)$$

Therefore, if such eye direction detecting optical system is employed, it can automatically determine the zone which is being viewed among the plurality of zones provided by the finder 16.

In the description of the principle, the center of each coordinate is found by arithmetic means. However, in view of the strength of the light received, the center of the coordinate may be found by weighted mean.

A specific example of an eye direction detecting optical system which is used in an auto optical focus detecting device of a single-lens reflex camera according to the present invention will be described.

Figure 29:
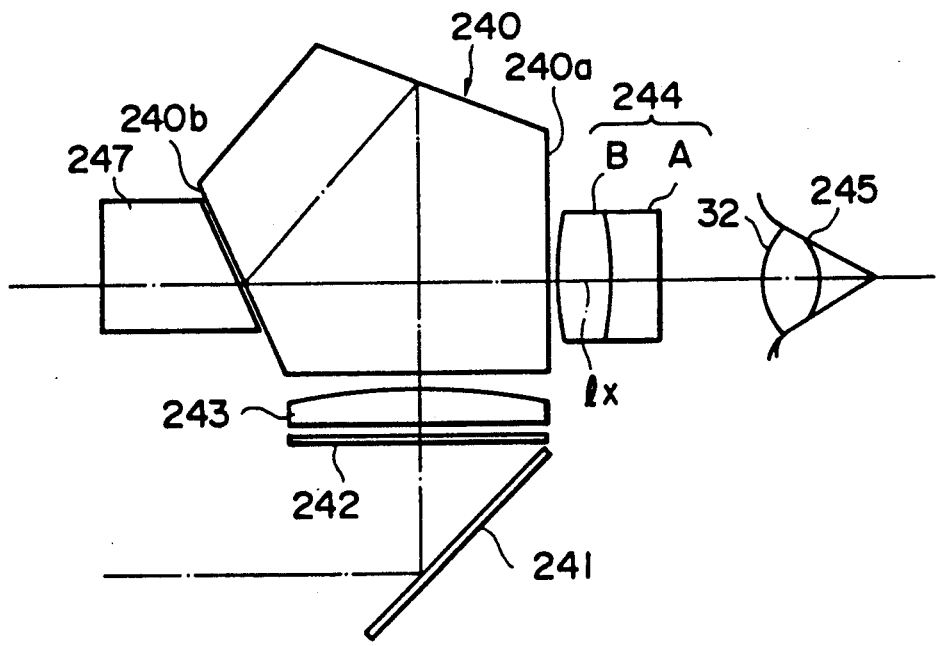

In FIG. 29, 240 denotes a pentagonal prism built in a camera, 242 a quick return mirror, 241 a focussing plate, 243 a condenser lens, 244 a finder magnifying lens, 245 an eye of the user, and lx the optical axis of the aforementioned finder optical system. In this example, the finder magnifying lens 244 comprises magnifying lenses A and B.

The camera is provided with a detecting optical system 246 for detecting the direction of the user's eye looking through the finder at the opposite side of the finder magnifying lens 244 with the pentagonal prism 240 disposed therebetween. In FIG. 29, a framework 247 of the eye direction detecting optical system 246 is shown.

The eye direction detecting optical system 246, as shown in FIGS. 30 and 31, has an infrared light source 248 such as, for example, an infrared light emitting diode for emitting an infrared light. The infrared light is projected to the user's eye 245 as a parallel pencil of rays through a half mirror 249, a minifying lens 250, a compensator prism 251, a pentagonal prism 240, and a finder magnifying lens 244. By this, the first Purkinje image PI is formed based on the specular reflection of the cornea 232. The infrared light is employed in this embodiment so as not to dazzle to the user with the illumination of the detecting optical system 246. Similarly, the minifying lens 250 is employed for the reasons that the optical path length of the detecting optical system 246 is made as short as possible so as to be compactly contained in the camera, and that since only the infrared reflecting light parallel to the optical axis lx is employed, the light volume reflected by the eye 245 is considered to be small, and the reflecting light is imaged on as small a dimension as possible on the light receiving surface of the light receiving element as an image receiving element as will be described so as to increase the sensitivity of the light receiving surface of the light receiving element.

Figure 32:
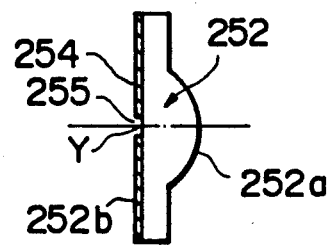

Of the light reflected by the cornea 232 of the eye 245, the bundle of rays parallel to the bundle of incident rays are guided to the half mirror 249 through finder magnifying lens 244, pentagonal prism 240, compensator prism 251, and minifying lens 250, then guided to a reimaging lens 252, by the half mirror 249, and then imaged on a two-dimensional solid photosensitive element 253 (such as, for example, a two-dimentional area CCD), as the image receiving element by the reimaging lens 252. The reimaging lens 252, as shown in FIG. 32, is provided with a mask 254. The mask 254 is formed with an opening 255. The center of the opening 255 is located in the center Y of curvature of the reimaging lens 252. The diameter of the opening 255 is about 0.2 mm in this embodiment.

Figure 33:
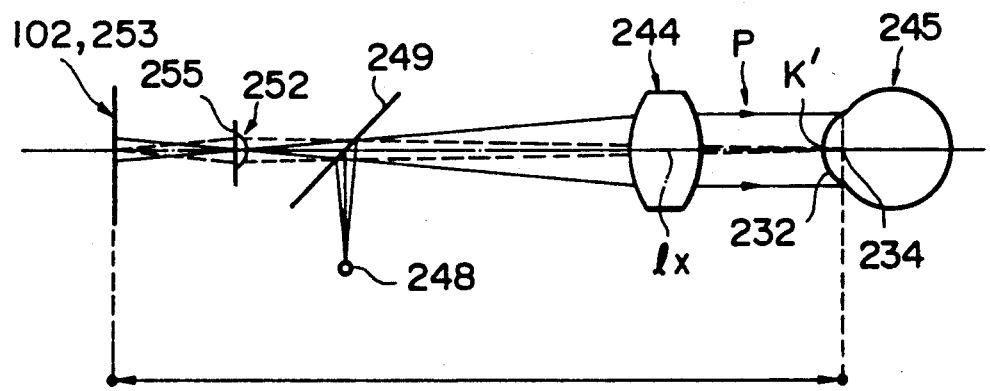

The user's eye 245 is usually placed on an eye point. The solid photosensitive element 253 and the pupil of the user's eye 245, as schematically illustrated in FIG. 33, are in optically conjugate position through finder magnifying lens 244, minifying lens 250, and the reimaging lens 252. On the solid photosensitive element 253, the periphery 234' of the pupil is formed as a silhouette together with the first Purkinje image PI by the light reflected on the eye fundus. Then, the receiving light output of the solid photosensitive element 253, as shown in FIG. 31, is amplified by the amplifier 256, then converted to a digital signal by an analog-digital converter 257, and then temporarily stored in a memory 259 of a microcomputer 258. The memory 259 is memorized with a distance $k_1$ as an information. The information of the distance $k_1$ and the information of the receiving light output are called to an arithmetic circuit 260, then processed based on the relations (1) through (4) to find the revolving angle $\theta$, and then a selected signal meaning which zone has been selected is output to a driver 261 from the revolving angle $\theta$. And, when the CCD of the auto focus optical system corresponding to the selected zone is driven by the driver 261, a distance to the subject to be photographed which is seen overlapped with the zone intended by the user can be automatically found.

Figure 28:
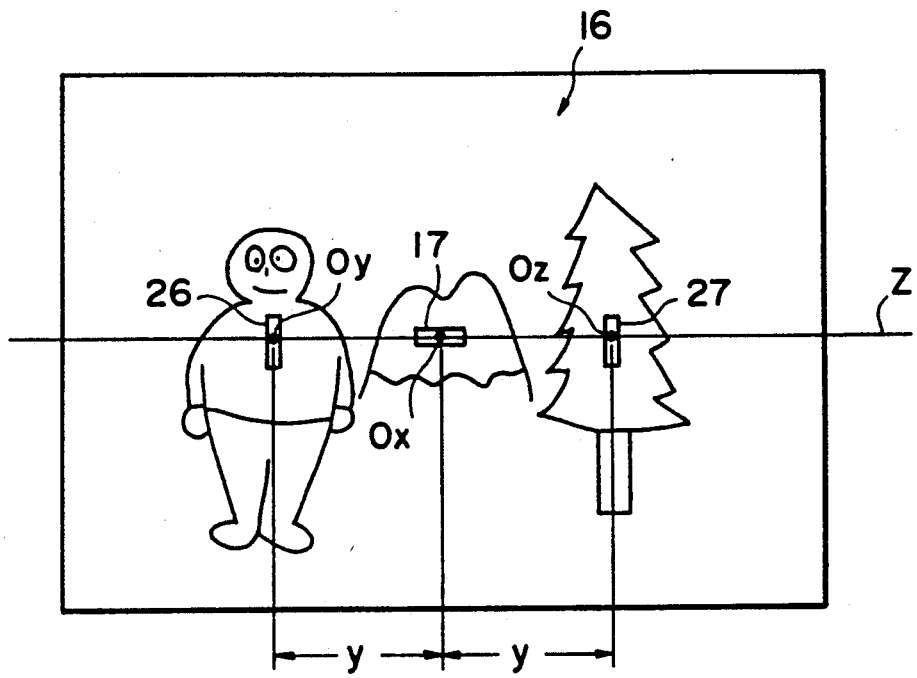

If the distance (the height of an image), as shown in FIG. 28, from the center Ox of the view field (the center of a focussing screen) of the finder 16 to the centers Oy and Oz of the zones at both right and left sides is represented by y, and if a focal distance of the finder magnifying lens 244 is represented by f, the following relation is obtained;

$$y = f \cdot \tan \theta \quad (5)$$

If the relation (5) is substituted with the relation (1), the following relation is obtained;

$$y = f \cdot d/(k_2 \cdot \cos \theta) \quad (6)$$

that is, y is proportional to $d/(k_2 \cdot \cos \theta)$. This means that even if the distorsion of an image formed on the image receiving element 253 is eliminated, the value of y can not be linearly found from the value of d, in other words, a nonlinearity is present.

In the case of a 35 mm camera, the image height y of a plurality of zones is considered to be about from 6 mm to 9 mm at the largest due to vignetting, etc.

In this embodiment, it is presumed that the eye direction detecting optical system 246 transmits the image of the pupil having the nonlinearity to the image receiving element 253 located behind the system 246 as it is and that the length d detected by the image receiving element 253 is proportional to the image height y. Then, it is merely detected in the longer side by from 0.7 to 1.6% than the actual length d. Therefore, it does not adversely affect the selection of the zone at all. However, from the view point that the accuracy of the eye direction detecting optical system must be improved, it is preferable that the nonlinearity is not present. In such case, it can be corrected by the microcomputer. However, if the distorsion is present in the optical system itself, the measurement becomes incorrect. Therefore, the distorsion of the optical system must be eliminated as a minimum requirement.

Therefore, in order to make the spherical aberration of the minifying lens 250 small, the plane 250a near the finder magnifying lens 244 is formed in an aspherical plane, and the focal position of the minifying lens 250 is positioned in the center Y of curvature of the reimaging lens 252. In this way, if the minifying lens 250 is formed in an aspherical plane and if the focal point of the minifying lens 250 is positioned in the center Y of curvature of the reimaging lens 252, the opening 255 is brought to be in the center Y of curvature of the reimaging lens 252. Thus, a distorsion free optical system can be obtained which is much preferable as an eye direction detecting system.

Next, one example of the designing of such eye direction detecting optical system will be described.

First, a distance from the magnifying lens A to an eye point is set to 14.7 mm, the central thickness of the magnifying lens A is set to 4.98 mm, the radius of curvature of the plane at the eye point side of the magnifying lens A is set to 181.168 mm of a convex, the radius of curvature of the plane at the side facing with the magnifying lens B of the magnifying lens A is set to −25.500 mm of a convex, and the refractive index of the magnifying lens A is set to 1.69105. And, a distance between the magnifying lenses A and B is set to 3.01 mm on the optical axis lx. Further, the central thickness of the magnifying lens B is set to 4.10 mm, the radius of curvature of the plane at the side facing with the magnifying lens A of the magnifying lens B is set to −23.860 mm of a concave, the radius of curvature of the plane at the side facing with the pentagonal prism 240 of the magnifying lens B is set to −48.140 mm of a convex, and the refractive index of the magnifying lens B is set to 1.79175. Further, a distance between the plane 240a of the pentagonal prism 240 and the magnifying lens B is set to 3.21 mm, a length from the plane 240a of the pentagonal prism 240 to the plane 240b is set to 28.00 mm on the optical axis lx, the radius of curvature of each plane 240a, 240b is set to ∞, and the refractive index of the pentagonal prism 240 is set to 1.51260. Next, a space between the plane 251a of the compensator prism 251 and the plane 240b of the pentagonal prism 240 is established to 0.10 mm, and a space between the plane 251b of the compensator prism 251 and the plane 250a of the minifying lens 250 is also established to 0.10 mm. The length of the planes 251b and 251a of the compensator prism 251 is set to 2.00 mm on the optical axis lx, the radius of curvature of each plane 251a, 251b is set to ∞, and the refractive index of the compensator prism 251 is set to 1.51260.

The minifying lens 250 is designed as such that the radius of curvature of the plane 250a is 12.690 mm ($k_3 = 3.00$) of a convex, the central thickness is 2.00 mm, and the refractive index is 1.48716. The radius of curvature of the other plane 250b of the minifying lens 250 is set to −200.000 mm of a convex, and a space between the reimaging lens 252 and the plane 250b is set to 11.48 mm.

The radius of curvature of the plane 252a of the reimaging lens 252 is set to 1.520 mm of a convex, the radius of curvature of the plane 252b is set to ∞, the central thickness of the reimaging lens 252 is set to 1.52 mm, and the refractive index is set to 1.48716 which is the same to that of the minifying lens 252. Since the mask 254, which has the opening 255 having the diameter of 0.2 mm, is bonded to the plane 252b, the space between the mask 254 and the plane 252b is 0 mm, the thickness of the mask is set to 0.04 mm, and the space between the mask 254 to the light receiving surface of the image receiving element 253 is set to 1.46 mm. The mask 254 and the light receiving surface of the image receiving element 253 is set to ∞, and spaces among the respective optical elements are filled with air.

$k_3$ denotes an aspheric spherical coefficient and has the following relation with the sag X:

$$X = h^2 c/(1 + \sqrt{1 - (k_3 + 1)h^2 c^2})$$

wherein h denotes the height from the optical axis lx, and c denotes an inverse number of the radius of curvature of the minifying lens 250.

Figure 34:
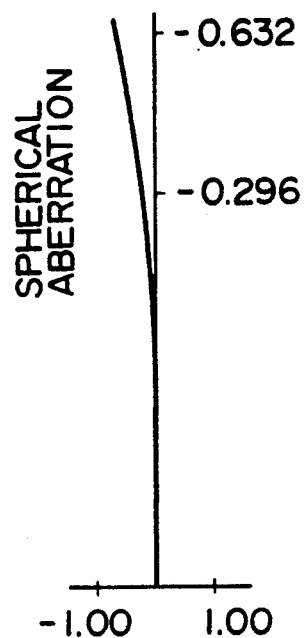
Figure 35:
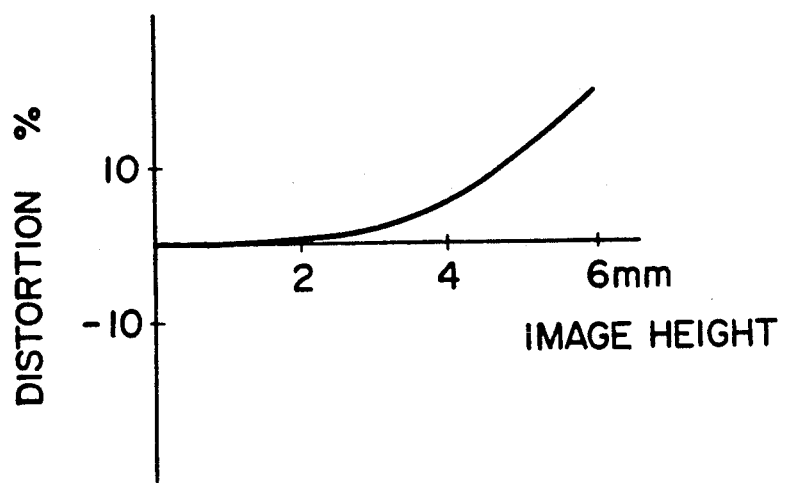
Figure 36:
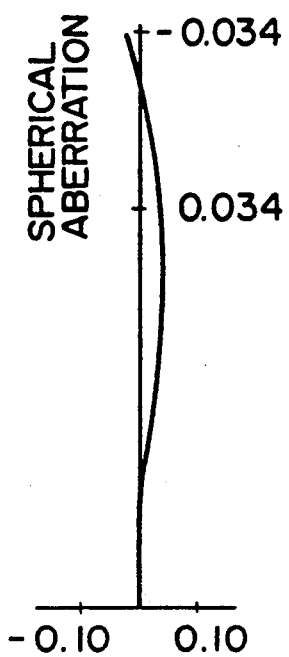
Figure 37:
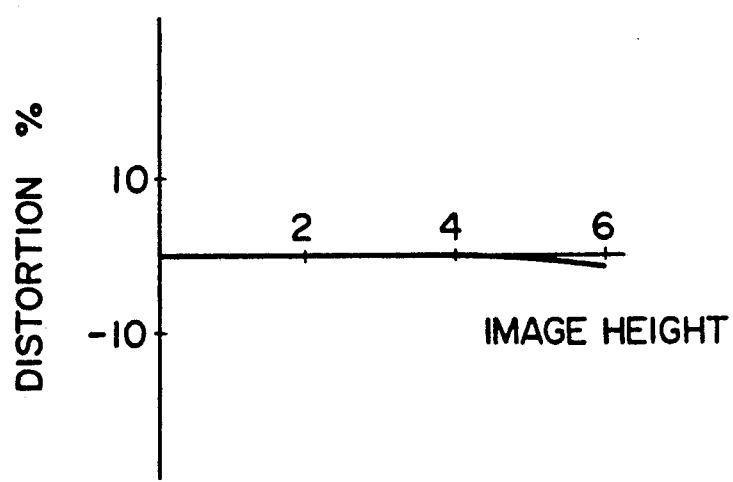

In case the minifying lens 250 is not aspherical, a spherical aberration is taken place as shown in FIG. 34, and a distorsion is present as shown in FIG. 35. However, if an eye direction detecting optical system which is designed in a way as mentioned above, the spherical aberration is improved as shown in FIG. 36. As a result, the distorsion is also improved as shown in FIG. 37.

Although a specific embodiment has been described in the foregoing, it may be designed as such that an LED corresponding to each zone 17, 26, 27 is provided within the view field of the finder 16, and the LED corresponding to the selected zone is blinked so as to confirm whether it is the zone intended by the user.

Next, an example of the improvement of an eye direction detecting optical system for use in an auto optical focus detecting device of a single-lens reflex camera according to the present invention will be described.

Figure 40:
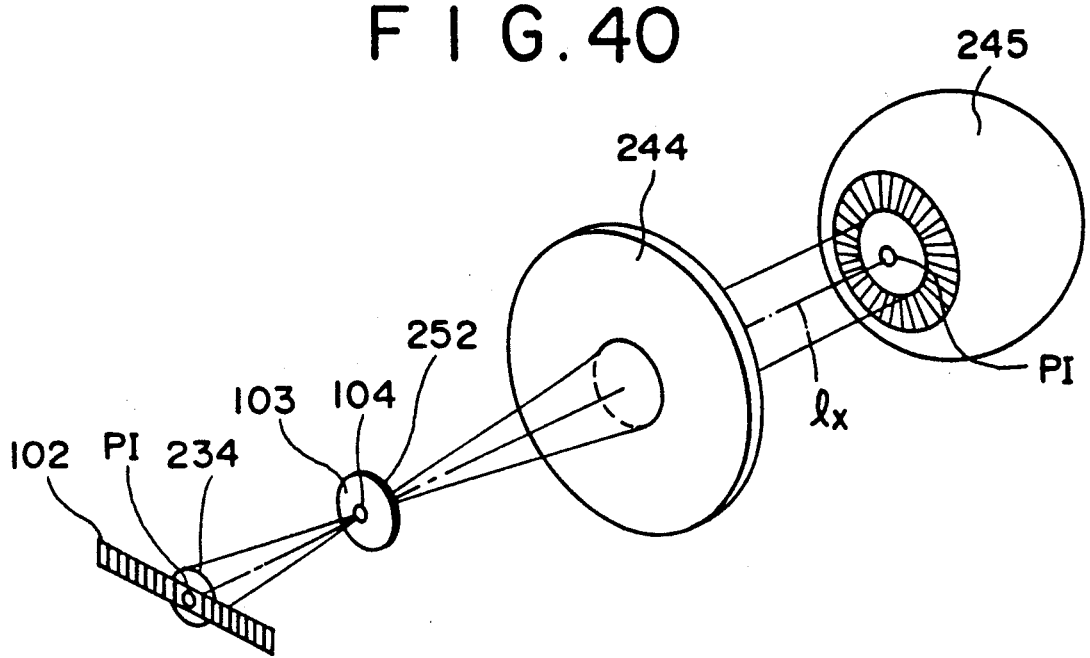
Figure 41:
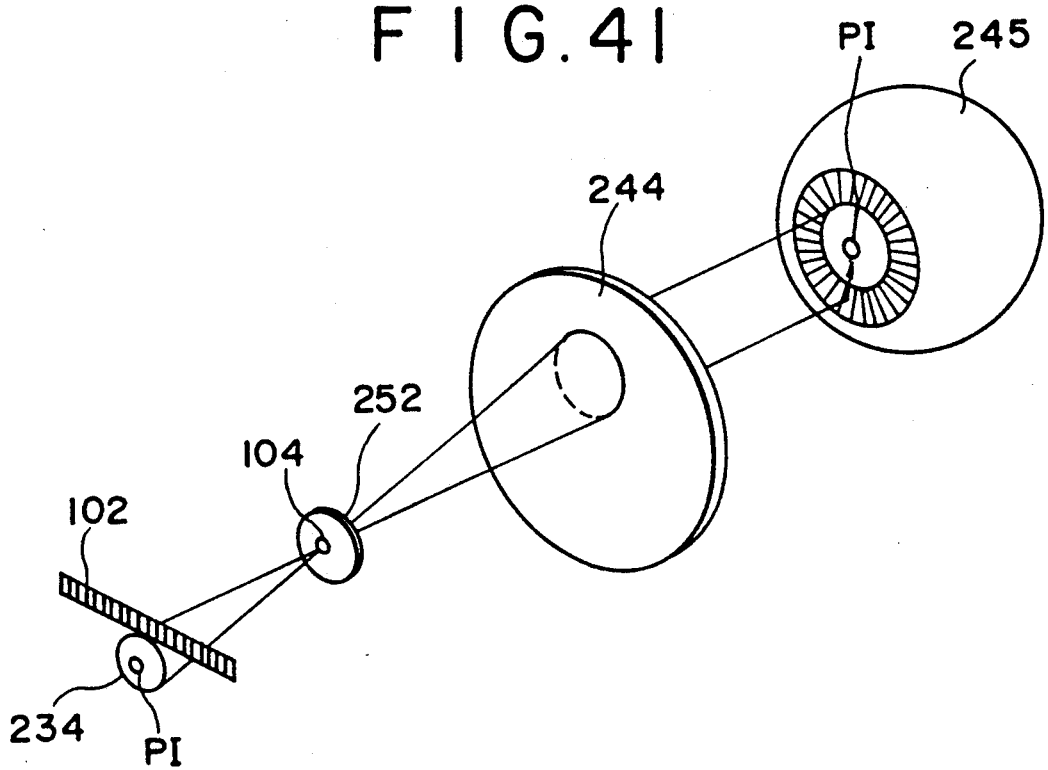

In the afore-mentioned case, a two-dimensional solid photosensitive element is employed as the image receiving element. However, since the arrangement of the solid photosensitive element is two-dimensional, it is expected that the scan processing time for scanning the solid photosensitive element, takes a long time. In addition, the cost becomes high. In one with a plurality of zones 17, 26 and 27 linearly arranged as shown by an arrow Z in FIG. 28, it is conceivable that a one-dimensional line sensor can be employed in which the photoelectronic element is disposed in the direction corresponding to the direction in which the zones 17, 26 and 27 are arranged. However, if such a one-dimensional line sensor is employed, the following problems occur. FIGS. 40 and 41 are illustrations for explaining these problems, In FIG. 41, 244 denotes a finder magnifying lens, 252 a reimaging lens, and 102 a one-dimensional line sensor as the image receiving element. As shown in FIG. 40, when the optical axis lx of the eye direction detecting optical system 246, i.e., the optical axis lx of the finder magnifying lens 244 and the eye direction axis X are in alignment, the pupil image 234a as the silhouette (periphery) of the pupil and the first Purkinje image PI are formed on the one-dimensional line sensor 102. Therefore, an eye direction detection can be carried out normally. However, when the human eye 245 is moved in the vertical direction with respect to the camera body, as shown in FIG. 41, the pupil image 234a as the silhouette and the first Purkinje image PI are out of the one-dimensional line sensor 102. Therefore, the eye direction detection is impossible to carry out normally and thus inconvenience.

Figure 38:
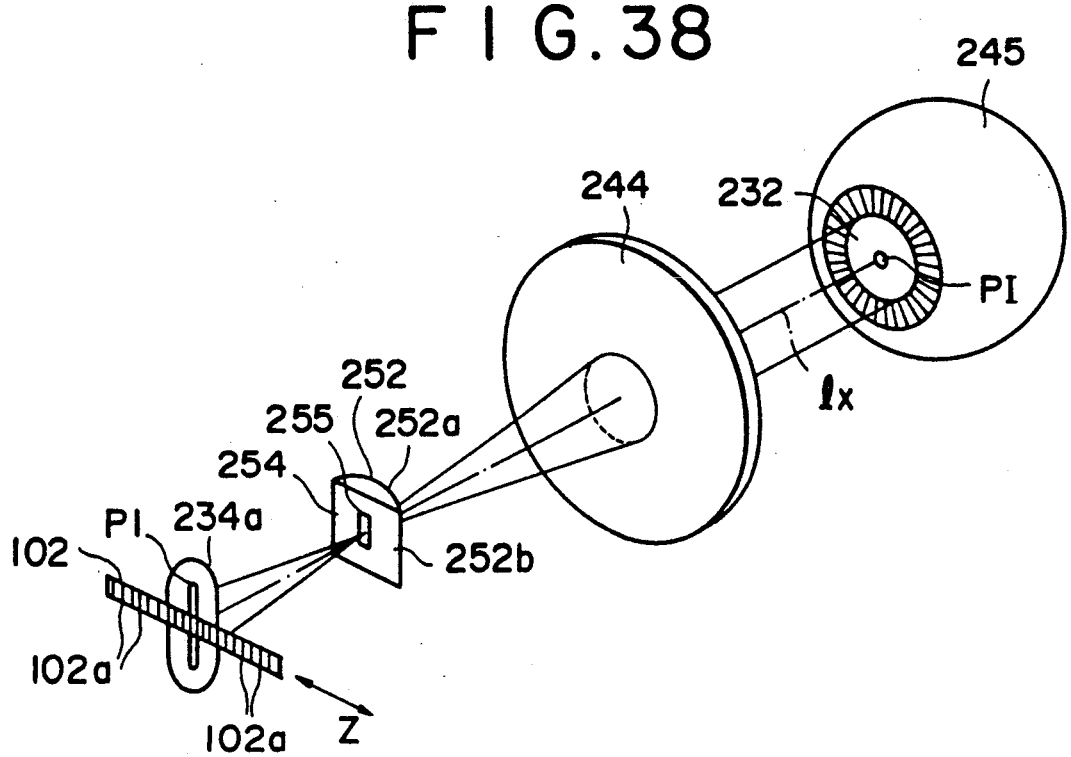
Figure 39:
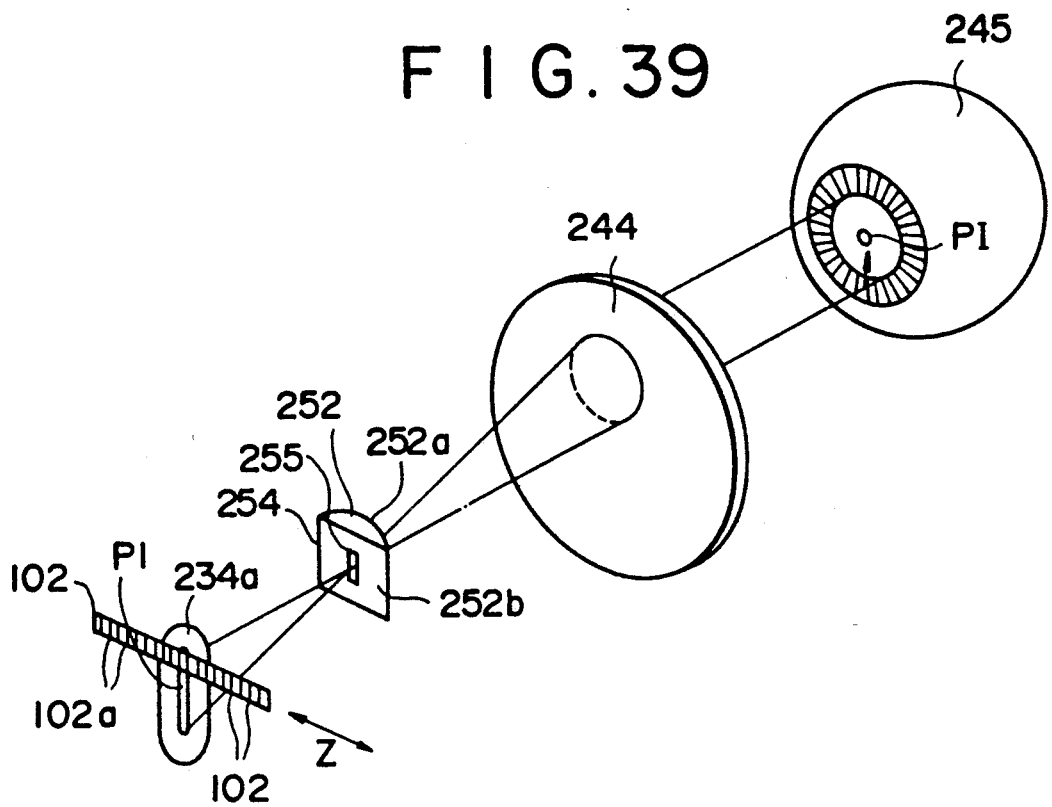

FIGS. 38 and 39 are illustrations for explaining the constitution for avoiding the inconvenience when the one-dimensional line sensor is employed.

In this one-dimensional line sensor 102, as shown in FIGS. 38 and 39, the photoelectronic elements 102 are arranged in a direction corresponding to the direction Z wherein a plurality of zones are arranged. A cylindrical lens is employed here as the reimaging lens 252. As shown in FIGS. 38 and 39, a mask 254 is provided to the plain face side of the cylindrical lens. The mask 254 is provided with an opening 255. The center of the opening 255 is located in the center Y of curvature of the reimaging lens 252. The opening 255 is a rectangular slit here. The extending direction of the slit 255 is perpendicular to the arranging direction of the photoelectronic elements of the one-dimensional line sensor 102. The reimaging lens 252 has a spherical surface disposed at the side of the finder magnifying lens 244.

The user's eye 245 is usually placed on the eye point, and the one-dimensional line sensor 102 and the pupil of the user's eye, as schematically illustrated in FIG. 33, are in optically conjugate relation with each other through finder magnifying lens 244, minifying lens 250 and reimaging lens 252. Therefore, the one-dimensional line, sensor 102 is formed with the pupil image 234a as the silhouette due to the light reflected by the eye fundus together with the first Purkinje image PI. The reimaging lens 252 is the cylindrical lens and is disposed as such that a vertically elongated first Purkinje image PI and pupil image 234a as the silhouette are formed in the direction perpendicular to the arranging direction of the one-dimensional line sensor 102 on a plane including the one-dimensional line sensor 102. Therefore, even if the eye 245 is moved in the vertical direction with respect to the camera body A₁ as shown in FIG. 39, at least one portion of the respective images PI and 234a are formed on the one-dimensional line sensor 102. Further, since the opening 255 of the mask 254 is also an elongated slit extending in the direction perpendicular to the arranging direction of the photoelectronic elements 102a of the one-dimensional line sensor 102, the pupil image 234a and first Purkinje image PI formed on the plane including the one-dimensional line sensor 102 become longer in the vertical direction perpendicular to the arranging direction. Therefore, the eye direction detection can be carried out reliably. Therefore, if the receiving light output of each photoelectronic element 102a of the one-dimensional line sensor 102 is amplified by the amplifier 256 and converted to a digital signal by the analog-digital converter 257 to be subjected to a predetermined processing, the eye direction can be detected.

In the afore-mentioned embodiment, although a cylindrical lens is employed as the reimaging lens 252, a toric lens may be employed.

What is claimed is:

1. An optical focus detecting device, comprising: focus detecting optical systems that detects light beams passing through a taking lens of a camera to detect a focus status of said taking lens at independent zones in a viewing field, wherein at least one focus detecting optical system of said focus detecting optical systems changes a direction of an optical path of said light beam according to a change in a characteristic of said taking lens so as to direct an optical axis of said at least one focus detecting optical system towards a center of an exit pupil of said taking lens.

2. The optical focus detecting system of claim 1, wherein said focus detecting optical systems comprise a rotatable focus unit that changes said optical path of said light beam.

3. The optical focus detecting system of claim 2, wherein said rotatable focus unit is mechanically rotated.

4. The optical focus detecting system of claim 3, wherein said rotatable focus unit is built into a camera body of said camera.

5. The optical focus detecting system of claim 1, wherein a prism is selectively placed proximate said focus detecting optical systems to change said optical path of said light beam.

6. The optical focus detecting system of claim 5, wherein said prism is mechanically rotated.

7. The optical focus detecting system of claim 1, wherein said optical path of said light beam is changed by selectively positioning at least one of a plurality of optical elements proximate at least a portion of said focus detecting optical systems.

8. The optical focus detecting system of claim 7, wherein said plurality of optical elements have various optical properties.

9. The optical focus detecting system of claim 8, wherein said at least one of said plurality of optical elements is selected based upon an optical characteristic of said taking lens.

10. The optical focus detecting system of claim 7, wherein said plurality of optical elements have a cylindrical plate shape.

11. The optical focus detecting system of claim 7, wherein said plurality of optical elements are positioned substantially around a periphery of said focus detecting optical systems, a rotary member being positioned about a predetermined axis, said rotary member being adapted to be selectively rotated about said predetermined axis to thereby effect said selective positioning of said at least one of said plurality of optical elements between said taking lens and at least one focus detecting optical system of said focus detecting optical systems.

12. The optical focus detecting system of claim 11 wherein said predetermined axis is optionally aligned with an optical axis of said taking lens.

13. The optical focus detecting system of claim 1, wherein said plural focus detecting optical system comprises a transparent disk having a prism portion provided proximate a periphery of said transparent disk, said transparent disk being rotated according to an optical characteristic of said taking lens.

14. The optical focus detecting system of claim 1, wherein said focus detecting optical system comprise a transparent disk having a prism portion provided proximate a periphery of said transparent disk, said transparent disk being continuously rotated according to an optical characteristic of said taking lens in order to determine a focusing position that is best suited for said taking lens.

15. The optical focus detecting system of claim 13 wherein said taking lens includes a memory that stores optical characteristic of said taking lens, such that when said taking lens is used with said camera, said transparent disk is rotated according to said optical characteristic of said taking lens.

16. The optical focus detecting system of claim 1, wherein said at least one focus detecting optical system of said plural focus detecting optical system is disposed in such a manner as to change an optical path of said light beam in accordance with a focal length of said taking lens.

17. An optical focus detecting device, comprising:
focus optical detectors that detect beams of light that pass through a lens associated with said focus optical detectors to detect a focusing status of said associated lens at independent zones in a viewing field; and
means for changing a direction of an optical path of said light beam in accordance with a focal length of said associated lens.

18. The optical focus detecting system of claim 17, wherein said optical path changing means comprises a rotatable focus unit.

19. The optical focus detecting system of claim 18, wherein said rotatable focus unit is mechanically rotated.

20. The optical focus detecting system of claim 19, wherein said rotatable focus unit is built into a camera body of said camera.

21. The optical focus detecting system of claim 17, wherein said optical path changing means comprises a prism that is selectively positionable proximate said focus optical detectors.

22. The optical focus detecting system of claim 21, wherein said prism is mechanically rotated.

23. The optical focus detecting system of claim 17, wherein said optical path changing means comprises at least one of a plurality of optical elements selectively positioned proximate at least a portion of said focus optical detectors.

24. The optical focus detecting system of claim 23, wherein said plurality of optical elements have various optical properties.

25. The optical focus detecting system of claim 24, wherein said at least one of said plurality of optical elements is selected based upon an optical characteristic of said associated lens.

26. The optical focus detecting system of claim 23, wherein said plurality of optical elements have a cylindrical plate shape.

27. The optical focus detecting system of claim 23, wherein said plurality of optical elements are positioned substantially around a periphery of said focus optical detectors, a rotary member being positioned about a predetermined axis and being adapted to be selectively rotated about said predetermined axis to effect said selective positioning of said at least one of said plurality of optical elements between said associated lens and at least a portion of said focus optical detectors.

28. The optical focus detecting system of claim 27, wherein said predetermined axis is optically aligned with an optical axis of said associated lens.

29. The optical focus detecting system of claim 17, wherein said plural focus optical detector comprises a transparent disk having a prism portion provided proximate a periphery of said transparent disk, said transparent disk being rotated according to an optical characteristic of said associated lens.

30. The optical focus detecting system of claim 17, wherein said focus optical detectors comprises a transparent disk having a prism portion provided proximate a periphery of said transparent disk, said transparent disk being continuously rotated according to an optical characteristic of said associated lens in order to determine a focusing portion that is best suited for said associated lens.

31. The optical focus detecting system of claim 29, wherein said associated lens includes a memory that stores said optical characteristic of said associated lens, such that when said associated lens is used with said camera, said transparent disk is rotated according to said stored optical characteristic of said associated lens.

32. An optical focus detecting device, comprising:
a lens;
a focus detecting optical unit defining a plurality of focusing zones for detecting a light beam passing through said lens, said focus detecting optical unit detecting a focusing status of said lens at said focusing zones; and
means for changing a direction of an optical path of said light beam in accordance with a focal length of said lens in response to at least one focusing zone of said plurality of focusing zones.

33. The optical focal detecting device of claim 32, wherein said focus detecting optical unit comprises a rotatable focus unit contained in a camera body corresponding to each of said plurality of focusing zones, such that when said lens is attached to said camera body, said rotatable focus unit is mechanically rotated so that said light beam passing through said lens is automatically made incident to said focus detecting optical unit according to a characteristic of said lens.

34. The optical focus detecting device of claim 32, wherein said optical path changing means comprises a prism that is adapted to be selectively positioned between said lens and said at least one focusing zone.

35. The optical focus detecting device of claim 34, wherein said optical path changing means comprises means for mechanically changing said optical path.

36. The optical focus detecting device of claim 35, wherein said mechanically changing means comprises:
means for holding said focus detecting optical unit; and means for mechanically linking said holding means, including means adapted to be contacted by a lens mount to effect said optical path change.

37. The optical focus detecting device of claim 32, wherein said optical path changing means comprises an optical means that is selectively positionable between said lens and at least a portion of at least one of said plurality of focusing zones.

38. The optical focus detecting device of claim 33, wherein said optical path changing means comprises a plurality of optical elements having different optical characteristics, said plurality of optical elements being selectively positionable between said lens and at least a portion of at least one of said plurality of focusing zones.

39. The optical focus detecting device of claim 38, wherein a respective one of said plurality of optical elements is selectively positionable between said lens and at least a portion of at least one of said plurality of focusing zones according to an optical characteristic of said lens.

40. The optical focus detecting device of claim 39, wherein said lens comprises a lens that is selectively attachable to an apparatus, whereby when said lens is selectively attached to said apparatus, a respective one of said plurality of optical elements is positioned between said lens and at least a portion of said focus detecting optical unit.

41. The optical focus detecting device of claim 40, wherein said apparatus comprises a camera body.

42. The optical focus detecting device of claim 40, wherein said lens includes a memory that stores information of its respective optical characteristic, and said apparatus further comprises means for reading said information stored in said memory, so that when said lens is attached to said apparatus, said memory is read for positioning said optical means.

43. The optical focus detecting device of claim 37, wherein said optical means has a cylindrical plate shape.

44. The optical focus detecting device of claim 43, wherein said optical means comprises an optical member constituting said plurality of optical elements, said optical member being supported by a rotary member.

45. The optical focus detecting device of claim 44, wherein said plurality of optical elements are positioned substantially around a periphery of said optical means, said rotary member being positioned about a predetermined axis, and wherein said rotary member is adapted to be selectively rotated about said predetermined axis to effect a selective positioning of said plurality of optical elements between said lens and a respective one of said plurality of focusing zones.

46. The optical focus detecting device of claim 45, wherein said plurality of optical elements comprise an annularly shaped prism portion having at least two different apex angles.

47. The optical focus detecting device of claim 45, wherein said plurality of optical elements comprise at least one prism and at least one transparent portion.

48. The optical focus detecting device of claim 45, wherein said predetermined axis is optically aligned with an optical axis of said lens.

49. The optical focus detecting device of claim 48, wherein said rotary member comprises:
an outer periphery; and
means for guiding said outer periphery during a rotation of said rotary member.

50. The optical focus detecting device of claim 49, wherein said guiding means comprises:

a peripherally extending groove in said outer periphery; and
means for engaging said groove.

51. The optical focus detecting device of claim 50, wherein said engaging means comprises a plurality of rollers.

52. The optical focus detecting device of claim 51, further comprising means for driving said rotary member.

53. An auto optical focus detecting device according to claim 52, wherein said driving means comprises a motor.

54. The optical focus detecting device of claim 53, further comprising means for controlling said motor.

55. The optical focus detecting device of claim 54, wherein said controlling means comprises a motor driver and a microprocessor that controls said motor driver.

56. An optical focus detecting device, comprising:
focus detecting optical systems that detect a light beam that pass through a taking lens of a camera to detect a focusing status of said taking lens at independent zones in a viewing field; and
a rotatable prism unit that has a plurality of prisms having different angles to each other, said rotatable prism unit being disposed in such a manner as to insert one of said plurality of prisms in an optical path of at least one of said focus detecting optical system so as to change a direction of said optical path of said at least one of said focus detecting optical systems, wherein one of said plurality of prisms is disposed in said optical path based upon an optical characteristic of said taking lens.

57. The optical focus detecting device of claim 56, wherein said rotatable prism is continuously rotated, and said focus detecting optical systems detect a focus of said taking lens at a predetermined timing.

58. The optical focus detecting device of claim 56, wherein said rotatable prism unit is mechanically rotated.

59. The optical focus detecting device of claim 56, wherein said rotatable prism unit is built into a camera body of said camera.

60. The optical focus detecting device of claim 56, wherein said rotatable prism unit is selectively placed proximate said focus detecting optical systems.

61. The optical focus detecting device of claim 56, wherein said plurality of prisms have various optical properties.

62. An optical focus detecting device, comprising:
a center focus detecting optical system that detects a focusing status of a taking lens of a camera at a center position of a viewing field;
at least one peripheral focus detecting optical system that detects a focusing status of said taking lens at a peripheral position of said viewing field; and
means for changing a direction of an optical path of said at least one peripheral focus detecting optical system according to a change in a characteristic of said taking lens so as to direct an optical axis of said at least one peripheral focus detecting optical system to a center of an exit pupil of said taking lens.

63. The optical focus detecting device of claim 62, wherein said direction changing means comprises a prism.

64. The optical focus detecting device of claim 62, wherein said direction changing means changes said optical path direction according to a change of a focal length of said taking lens.

* * * * *

UNITED STATES PATENT AND TRADEMARK OFFICE
CERTIFICATE OF CORRECTION

PATENT NO. : 5,291,234
DATED : March 1, 1994
INVENTOR(S) : Osamu SHINDO et al.

It is certified that error appears in the above-indentified patent and that said Letters Patent is hereby corrected as shown below:

At column 21, line 20 (claim 15, line 1), change "claim 13" to ---claim 13,---.
At column 21, line 26 (claim 16, line 1), change "system" to ---device---.
At column 22, line 23 (claim 30, line 2), change "comprises" to ---comprise---.

Signed and Sealed this

Ninth Day of May, 1995

Attest:

BRUCE LEHMAN

*Attesting Officer*  *Commissioner of Patents and Trademarks*